(12) United States Patent
Force et al.

(10) Patent No.: US 8,129,486 B2
(45) Date of Patent: Mar. 6, 2012

(54) DISCHARGE SYSTEMS AND METHODS OF USING THE SAME

(75) Inventors: Randall L. Force, Charleston, WV (US); Robert G. Aronson, Winfield, WV (US); Mark W. Blood, Hurricane, WV (US); Gerardo Corona, Houston, TX (US); Dung P. Le, Sugar Land, TX (US); W. Scott Hamilton, S. Charleston, WV (US); Thomas A. Maliszewski, Charleston, WV (US); William K. Lutz, Ripley, WV (US)

(73) Assignee: Univation Technologies, LLC, Houston, TX (US)

( * ) Notice: Subject to any disclaimer, the term of this patent is extended or adjusted under 35 U.S.C. 154(b) by 193 days.

(21) Appl. No.: 12/444,661

(22) PCT Filed: Sep. 10, 2007

(86) PCT No.: PCT/US2007/019647
§ 371 (c)(1),
(2), (4) Date: Dec. 30, 2009

(87) PCT Pub. No.: WO2008/045172
PCT Pub. Date: Apr. 17, 2008

(65) Prior Publication Data
US 2010/0092252 A1 Apr. 15, 2010

Related U.S. Application Data

(60) Provisional application No. 60/965,916, filed on Aug. 23, 2007, provisional application No. 60/850,552, filed on Oct. 10, 2006.

(51) Int. Cl.
*C08F 2/00* (2006.01)
*B01J 19/00* (2006.01)
*B01J 8/18* (2006.01)
*F27B 15/00* (2006.01)
*F27B 15/09* (2006.01)
*B65G 53/40* (2006.01)

(52) U.S. Cl. .............. 526/88; 526/65; 526/70; 422/129; 422/131; 422/139; 422/145; 406/155

(58) Field of Classification Search .................. 422/129, 422/131, 145; 406/138, 124, 28, 155, 168; 526/88, 65, 70; 55/474
See application file for complete search history.

(56) References Cited

U.S. PATENT DOCUMENTS

| | | | |
|---|---|---|---|
| 3,434,968 A | 3/1969 | Lowe | 210/44 |
| 4,003,712 A | 1/1977 | Miller | 422/62 |
| 4,380,960 A | 4/1983 | Dickinson | 110/347 |
| 4,621,952 A | 11/1986 | Aronson | 406/138 |
| 4,858,144 A * | 8/1989 | Marsaly et al. | 700/266 |

(Continued)

FOREIGN PATENT DOCUMENTS

EP 0250169 12/1987

(Continued)

*Primary Examiner* — Walter D Griffin
*Assistant Examiner* — Natasha Young

(57) ABSTRACT

A discharge system for removing a solid/gas mixture from a fluidized bed pressure vessel is provided. The discharge system includes a fluidized bed pressure vessel, a settling vessel, a transfer vessel, discharge line, primary discharge valve, and primary exit valve. Also in included is a method to operate the discharge system. The method includes transferring a solid/gas mixture from a fluidized bed pressure vessel to a settling vessel, transferring the solids to a transfer vessel, and then emptying the transfer vessel.

43 Claims, 7 Drawing Sheets

U.S. PATENT DOCUMENTS

| | | | |
|---|---|---|---|
| 5,116,940 A | 5/1992 | Eisinger | 528/483 |
| 5,348,573 A | 9/1994 | Tomassian et al. | 96/151 |
| 5,443,806 A | 8/1995 | Isaksson et al. | |
| 5,929,180 A | 7/1999 | Chinh | 526/68 |
| 6,255,411 B1 | 7/2001 | Hartley et al. | 526/88 |
| 6,472,483 B1 | 10/2002 | Goode et al. | 526/88 |
| 6,498,220 B2 | 12/2002 | Hartley et al. | 526/88 |
| 2001/0034422 A1 | 10/2001 | Hartley et al. | 526/88 |
| 2002/0029691 A1 | 3/2002 | McCombs et al. | 95/96 |
| 2003/0213745 A1 | 11/2003 | Haerther et al. | 210/602 |
| 2004/0166033 A1 | 8/2004 | Miller et al. | |
| 2010/0143050 A1 | 6/2010 | Force et al. | |

FOREIGN PATENT DOCUMENTS

| | | |
|---|---|---|
| EP | 0381364 | 8/1990 |
| WO | WO 2006/079774 | 8/2006 |

\* cited by examiner

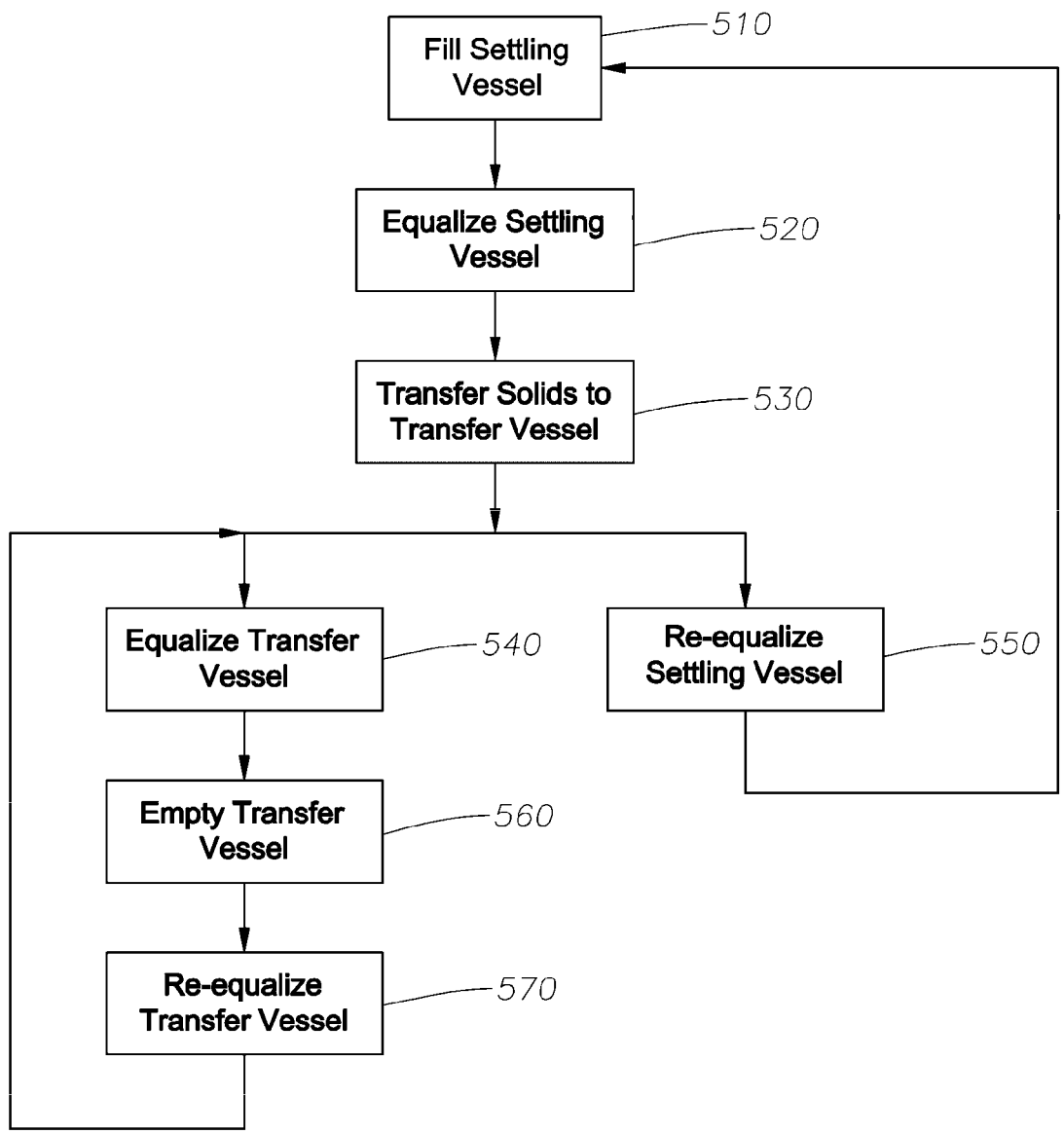

DISCHARGE SYSTEMS AND METHODS OF
USING THE SAME

CROSS-REFERENCE TO RELATED
APPLICATIONS

This application is a National Stage application under 36 U.S.C. §371 of International Application No. PCT/US2007/019647, filed Sep. 10, 2007, that claims the benefit of Provisional Application Nos. 60/850,552, filed Oct. 10, 2006, and 60/965,916, filed Aug. 23, 2007, the disclosures of which are incorporated by reference.

FIELD OF THE INVENTION

This disclosure relates generally to a discharge system and method for removing matter such as, for example, a solid/gas mixture, from a pressure vessel with minimum gas loss. More specifically, this disclosure relates to a system and method for removing primarily solids from a fluidized bed pressure vessel with minimum gas removal.

BACKGROUND

There are many systems and methods for discharging solids from a fluidized bed pressure vessel, gas phase fluidized bed pressure vessel, or gas phase fluidized bed polymerization vessel. However, the use of existing discharge systems and methods can result in higher loss of reactants from the discharge system than is desirable. Specifically, a significant amount of the gas or gas/liquid mixture may be lost because the void space within and around the particles is filled with a high-pressure gas mixture. The lost gas must then be either replaced, consuming additional raw materials, or recycled back into the system via compression, condensation with pumping, or a combination of these. In either scenario, raw materials are wasted and energy consumed.

One process that involves the discharge of a gas/solids mixture from a pressure vessel is the process for the manufacture of polyolefin resins, thereby involving the polymerization of olefin monomers in a fluidized bed reactor. An example of a process for the manufacture of polyolefin resins is disclosed in, for example, U.S. Pat. No. 4,003,712 ("the '712 patent"). As therein defined, a product is discharged from the reaction zone through a gas lock zone and the unreacted monomer that accompanies the resin is vented and recycled back to the reaction zone by compression. The product is then transferred to downstream equipment via a conventional dilute phase conveying system.

An alternative discharge system is described in, for example, U.S. Pat. No. 4,621,952 ("the '952 patent"). The '952 patent describes a gas lock zone system involving multiple settling vessels operating in series. The '952 patent describes that the gas mixture lost from the process could be significantly reduced by using the gas displacing ability of solids using two or more vessels with pressure equalization between each. As described, a valve between a nozzle on the fluidized bed pressure vessel and settling vessel is opened, and solids along with pressurized gas enter settling vessel. A second connection between the top of the settling vessel to a slightly lower pressure section of the reactor provides a flow path for the gas while solids settle out to essentially fill settling vessel. Both valves are then closed, leaving the settling vessel full of the solid particles, but with interstitial spaces between the particles filled with the gas mixture, and the settling vessel at full reactor pressure. The settling vessels of the discharge systems described in the '952 patent typically comprise a hemispherical top head, a straight section and a conical bottom section. The second connection is typically in this hemispherical head.

After the settling tank is isolated from the fluidized bed pressure vessel, a valve is then opened and solids are transferred to a transfer tank. As the solids flow into the transfer tank, pressure equalization also occurs between transfer tank and settling vessel. Upon completion, the pressure in transfer tank and settling vessel are at a moderate level. However, the transfer tank still contains a substantial amount of gas in the interstitial spaces between particles. Some practitioners then open a crosstie valve to allow the moderate pressure gas to transfer to an empty transfer tank in another series of tanks. Once the pressure in the transfer tank is relatively low, the product is transferred to other vessels for additional processing with only a modest pressurized gas transfer therein. The gas retained in the settling vessel is transferred back into the fluidized bed pressure vessel during the next fill cycle.

Additionally, U.S. Pat. Nos. 6,255,411 ("the '411 patent") and 6,498,220 describe the crosstie concept mentioned above in detail and describe various improvements. The '411 patent also offers a faster cycle time.

Other background references include U.S. Pat. No. 6,472,483, EP 0 250 169A2, and WO 2006/079774.

Accordingly, there exists a need for an improved method to remove matter, such as, primarily solids, from a fluidized bed pressure vessel with maximum volumetric fill of the settling tank, which results in greater efficiency in the processing of the matter, while addressing safety concerns of dealing with a pressurized reactor system.

SUMMARY

The invention described herein provides a method and system for removing solids from a fluidized bed pressure vessel. In one class of embodiments, the discharge system comprises: a settling vessel comprising a conical top head; a discharge line fluidly connecting a fluidized bed pressure vessel to the settling vessel; a primary discharge valve that controls a discharge flow of a fluid mixture from the fluidized pressure vessel through the discharge line to the settling vessel; a transfer vessel in fluid communication with the settling vessel; a transfer valve between the settling vessel and the transfer vessel that controls a transfer flow from the settling vessel to the transfer vessel; and a primary exit valve that controls an exit flow of the fluid mixture from the transfer vessel.

In any of the embodiments described herein, the transfer vessel may comprise a conical top head.

In other embodiments, the invention may comprise a secondary discharge valve in series with the primary discharge valve, wherein the primary discharge valve and the secondary discharge valve are located between the fluidized bed pressure vessel and the settling vessel, and wherein both the primary discharge valve and the secondary discharge valve control the discharge flow to the settling vessel.

In still other embodiments, the invention may comprise at least two secondary discharge valves and at least two settling vessels, wherein each secondary discharge valve controls the flow to one settling vessel, and wherein one primary discharge valve is in fluid communication with the at least two secondary discharge valves and the at least two settling vessels, such that the one primary discharge valve, in combination with the at least two secondary discharge valves, controls the discharge flow to each of the at least two settling vessels.

In yet other embodiments, the invention may comprise a vent line fluidly connecting an upper portion of the fluidized bed pressure vessel and the settling vessel and a primary vent valve that controls a vent flow through the vent line.

In still other embodiments, the invention may comprise a secondary vent valve in series with the primary vent valve that controls a vent flow through the vent line in addition to the primary vent valve.

Other embodiments may comprise at least two secondary vent valves and at least two settling vessels, wherein each secondary vent valve controls the vent flow between the upper portion of the fluidized bed pressure vessel and one settling vessel, and wherein one primary vent valve is in fluid communication with the at least two secondary vent valves and the at least two settling vessels, such that the one primary vent valve, in combination with the at least two secondary vent valves, controls the vent flow between the upper portion of the fluidized bed pressure vessel and each of the at least two settling vessels.

Any of the embodiments described herein may comprise a secondary exit valve, wherein both the primary exit valve and the secondary exit valve control the exit flow from the transfer vessel.

Any of the embodiments described herein may comprise a means to detect an abnormal condition in the discharge system, and a means to close the secondary exit valve upon detection of the abnormal condition.

In some embodiments, the means to detect an abnormal condition may comprise an automated control system and a means to detect pressure, flow, temperature, vessel stress, valve position, or actuator position.

In some embodiments, the means to close the secondary exit valve may comprise the automated control system and a signal to close the secondary exit valve.

In other embodiments, the secondary exit valve may be normally open.

In still other embodiments, the secondary exit valve may close within about 5 seconds, or within about 2.5 seconds of detection of the abnormal condition.

Any of the embodiments described herein, may comprise a solids monitoring device that detects when a settling vessel is full.

Any of the embodiments described herein, may comprise a dry-gas purge fed to the settling vessel.

Any of the embodiments described herein, may comprise a dry-gas purge fed to the transfer vessel.

Any of the embodiments described herein, may comprise a clean-gas purge fed to the discharge line.

Any of the embodiments described herein, may comprise a clean-gas purge fed to the vent line.

Another class of embodiments described herein relate to a method for removing solids from a fluidized bed pressure vessel. The method includes the steps of: providing a discharge system comprising a plurality of settling vessels and a plurality of transfer vessels, wherein at least one of the a plurality of settling vessels comprises a conical top head; filling a first settling vessel of the plurality of settling vessels with a mixture from a fluidized bed pressure vessel, wherein the mixture comprises a solid and a pressurized gas; equalizing the first settling vessel, wherein a first portion of pressurized gas is transferred from the first settling vessel to at least one of the plurality of settling vessels that is not the first settling vessel; transferring the solid and a second portion of pressurized gas from the first settling vessel to a first transfer vessel; re-equalizing the first settling vessel, wherein a return pressurized gas is transferred from at least one of the plurality of settling vessels that is not the first settling vessel to the first settling vessel; equalizing the first transfer vessel with a second transfer vessel, wherein a third portion of the pressurized gas is transferred from the first transfer vessel to at least one of the plurality of transfer vessels that is not the first transfer vessel; emptying the first transfer vessel; and re-equalizing the first transfer vessel, wherein a return transfer gas is transferred from at least one of the plurality of transfer vessels that is not the first transfer vessel to the first transfer vessel.

In any of the embodiments, at least one of the plurality of transfer vessels provided may comprise a conical top head.

Any of the embodiments described herein the method may provide a primary exit valve and a secondary exit valve, wherein the secondary exit valve may be closed automatically when an abnormal condition is detected.

Other embodiments of the method may comprise the steps of clean-gas purging a discharge line, clean-gas purging a vent line, dry-gas purging a settling vessel, or dry-gas purging a transfer vessel.

In other embodiments, the method may provide that a volume of discharged solid particles is at least about 100% of the actual volume of the settling vessel.

In yet other embodiments, the method may provide that a volume of discharged solid particles is about 90% or greater, or, in the alternative, about 95% or greater, of a valved-in volume of the first settling vessel.

In another class of embodiments, the invention provides a discharge system, the discharge system comprises: at least three settling vessels arranged in parallel; a discharge line fluidly connecting a fluidized bed pressure vessel to at least one of the at least three settling vessels; a primary discharge valve that controls a discharge flow of a fluid mixture from the fluidized pressure vessel through the discharge line to at least one of the at least three settling vessels; a vent line fluidly connecting an upper portion of the fluidized bed pressure vessel and at least one of the at least three settling vessels; a primary vent valve that controls a vent flow through the vent line; at least three crosstie lines fluidly connecting the at least three settling vessels; a crosstie valve that controls a crosstie flow through the at least three crosstie lines, wherein the crosstie valve is a multi-port valve; at least three transfer vessels in fluid communication with the at least three settling vessels; at least three transfer valves between the at least three settling vessels and the at least three transfer vessels that control a plurality of transfer flows from the at least three settling vessels to the at least three transfer vessels; a lower crosstie line fluidly connecting at least two of the at least three vessels; a lower crosstie valve that controls a lower crosstie flow through the lower crosstie line; and at least three primary exit valves that control a plurality of exit flows of the fluid mixture from the at least three transfer vessels.

In any of the embodiments, the multi-port crosstie valve may be a flow-controlling type valve. In any of the embodiments the multi-port crosstie valve may have a variable flow area depending on the degree of rotation of a stem of the crosstie valve.

In any of the embodiments, the multi-port crosstie valve may be a v-ball valve.

In some of the embodiments, the crosstie line may be absent a flow restricting device other than the crosstie valve.

In some embodiments, the discharge system may comprise at least three lower crosstie lines, and the lower crosstie valve is a multi-port valve that controls the lower crosstie flow through the at least three lower crosstie lines.

In any of the embodiments, the lower crosstie multi-port valve may be a flow-controlling type valve. In some embodiments, the lower crosstie multi-port valve may have a variable flow area depending on the degree of rotation of a stem of the crosstie valve.

In some embodiments, the lower crosstie multi-port valve may be a v-ball valve.

In some embodiments, the lower crosstie line may be absent a flow restricting device other than the lower crosstie valve.

Another class of embodiments described herein provides a discharge system comprising: a plurality of settling vessels arranged in parallel; a discharge line fluidly connecting a fluidized bed pressure vessel and at least two of the plurality of settling vessels; a primary discharge valve that controls a discharge flow of a fluid mixture from the fluidized pressure vessel through the discharge line to at least two of the plurality of settling vessels; a plurality of secondary discharge valves, wherein each of the plurality of secondary discharge valves controls the discharge flow to at least one of the plurality of settling vessels; a plurality of transfer vessels in fluid communication with the plurality of settling vessels; a plurality of transfer valves between the plurality of settling vessels and the plurality of transfer vessels that control plurality of transfer flows from the plurality of settling vessels to the plurality of transfer vessels; and a plurality of primary exit valves that control a plurality of exit flows of the fluid mixture from the plurality of transfer vessels.

In any embodiment described herein, the discharge system may further comprise a vent line fluidly connecting an upper portion of the fluidized bed pressure vessel and the settling vessel, and a primary vent valve that controls a vent flow through the vent line.

Some embodiments may comprise a secondary vent valve in series with the primary vent valve that controls the vent flow through the vent line in addition to the primary vent valve.

Other embodiments may comprise at least two secondary vent valves and at least two settling vessels, wherein each secondary vent valve controls the vent flow between the upper portion of the fluidized bed pressure vessel and one settling vessel, and wherein one primary vent valve is in fluid communication with the at least two secondary vent valves and the at least two settling vessels, such that the one primary vent valve, in combination with the at least two secondary vent valves, controls the vent flow between the upper portion of the fluidized bed pressure vessel and each of the at least two settling vessels.

In another class of embodiments described herein, a discharge system comprises: a settling vessel; a discharge line fluidly connecting a fluidized bed pressure vessel and the settling vessel; a discharge valve that controls a discharge flow of a fluid mixture from the fluidized pressure vessel through the discharge line to the settling vessel; a transfer vessel that receives solid particles from the settling vessel; a transfer valve between the settling vessel and the transfer vessel that controls a transfer flow from the settling vessel to the transfer vessel; a primary exit valve that controls an exit flow of the fluid mixture from the transfer vessel; a secondary exit valve that controls the exit flow of the fluid mixture from the transfer vessel in addition to the primary exit valve; a means to detect an abnormal condition in the discharge system; and a means to close the secondary exit valve upon detection of the abnormal condition.

In one embodiment, the means to detect an abnormal condition may comprise an automated control system and a means to detect pressure, flow, temperature, vessel stress, valve position, or actuator position.

In other embodiments, the means to close the secondary exit valve may comprise the automated control system and an automatic actuator connected to the secondary exit valve.

In still another embodiment, the secondary exit valve is normally open.

In other embodiments wherein the secondary exit valve is normally open, the secondary exit valve may close within about 5 seconds, or within about 2.5 seconds, of detection of the abnormal condition.

In yet another aspect of the invention, embodiments herein relate to a method for removing a solid from a fluidized bed pressure vessel comprising the steps of: providing a discharge system comprising a discharge line, settling vessel, discharge valve, transfer vessel, transfer valve, primary exit valve, and secondary exit valve; filling the settling vessel with a mixture from a fluidized bed pressure vessel, wherein the mixture comprises a solid and a pressurized gas; transferring the solid and a portion of pressurized gas from the settling vessel to the transfer vessel; emptying the transfer vessel to a receiving vessel; monitoring the discharge system for an abnormal condition with an automated control system; and closing the secondary exit valve automatically when the abnormal condition is detected.

In some embodiments, the filling step and the emptying step may occur at least partially concurrently.

In other embodiments, there may be only be a single valve closed between the fluidized bed pressure vessel and the receiving vessel during some steps of the method.

In still other embodiments, the abnormal condition is detected and the secondary exit valve is closed within about 10 seconds, or within about 5 seconds, of the occurrence of the abnormal condition.

In some embodiments, the abnormal condition may be a high pressure, high flow, or incorrect valve position in the discharge system.

In another class of embodiments described herein, a discharge system comprises: a plurality of settling vessels arranged in parallel; a discharge line fluidly connecting a fluidized bed pressure vessel to at least one of the plurality of settling vessels; a primary discharge valve that controls a discharge flow of a fluid mixture from the fluidized pressure vessel through the discharge line to at least one of the plurality of settling vessels; a crosstie line fluidly connecting at least two of the plurality of settling vessels; a crosstie valve that controls a crosstie flow through the crosstie line, wherein the crosstie valve is a flow-controlling type valve; a plurality of transfer vessels in fluid communication with the plurality of settling vessels; a plurality of transfer valves between the plurality of settling vessels and the plurality of transfer vessels that control a transfer flow from the plurality of settling vessels to the plurality of transfer vessels; a lower crosstie line fluidly connecting at least two of the plurality of transfer vessels; a lower crosstie valve that controls a lower crosstie flow through the lower crosstie line; and a plurality of primary exit valves that control a plurality of exit flows of the fluid mixture from the plurality of transfer vessels.

In some of the embodiments described herein, the crosstie valve may have a variable flow area depending on the degree of rotation of a stem of the crosstie valve.

In some of the embodiments described herein, the crosstie valve may be an eccentric plug rotary valve, v-ball valve, or butterfly valve.

In some embodiments, the crosstie line may be absent a flow restricting device other than the crosstie valve.

In some of the embodiments described herein, the lower crosstie valve may be a flow-controlling type valve.

In some of the embodiments described herein, the lower crosstie valve may have a variable flow area depending on the degree of rotation of a stem of the crosstie valve.

In some of the embodiments described herein, the lower crosstie valve may be an eccentric plug rotary valve, v-ball valve, or butterfly valve.

In yet other embodiments, the lower crosstie line may be absent a flow restricting device other than the lower crosstie valve.

BRIEF DESCRIPTION OF THE DRAWINGS

FIG. 5 is a block diagram of the steps of a method of removing a solid from a fluidized bed pressurize vessel.

DETAILED DESCRIPTION

Generally, embodiments disclosed herein relate to discharge systems for removing a solid/gas mixture from a pressurized vessel. More specifically, embodiments disclosed herein relate to discharge systems for removing flowable solid particles from a pressurized and fluidized vessel.

Figure 1:
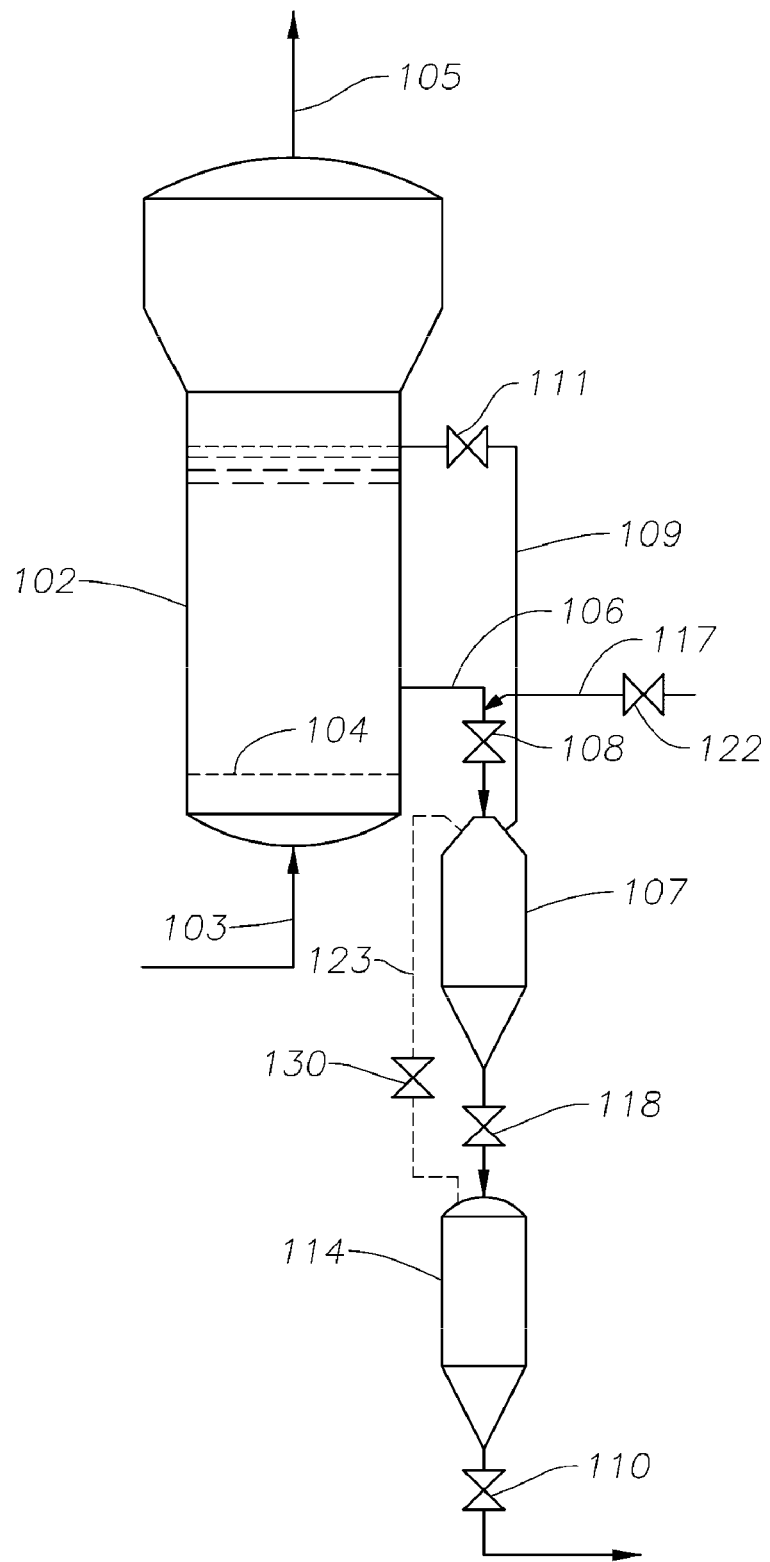
FIG. 1 is a schematic drawing of a single train discharge system.

Referring initially to FIG. 1, a schematic view of a fluidized bed pressure vessel and a discharge system in accordance with any of the embodiments of the present disclosure is shown. Generally, a granular solid is fluidized in the fluidized bed pressure vessel 102 by a flow of gas or gas/liquid mixture from an inlet 103, through a gas distributor 104, and exiting the fluidized bed pressure vessel 102 through outlet 105 for recycling. The fluidized bed pressure vessel 102 may be a reactor, a polymerization reactor, a vessel capable of holding a fluidized solid, or any pressure vessel from which a granular, powder, or particulate solid product may be removed.

Still referring to FIG. 1 (see also FIGS. 3 and 4), in any embodiments of the invention described herein, a discharge system comprises a discharge line 106, 306*a-d*, 406*ab,cd*, a settling vessel 107, 307*a-d*, 407*a-d*, a primary discharge valve 108, 308*a-d*, 408*ab,cd*, a transfer valve 114, 314*a-d*, 414*a-d*, a transfer valve 118, 318*a-d*, 418*a-d*, and a primary exit valve 110, 310*a-d*, 410*a-d*. Although this disclosure only discusses components necessary for functionality within the present disclosure, the discharge system, one of ordinary skill in the art will recognize that additional components not discussed herein including, for example, pressure monitoring equipment, additional release valves, fill sensors, safety regulators, or any other component beneficial in the removal of a solid from a fluidized bed pressure vessel may be optionally included. In addition, any embodiment herein may also comprise a vent line 109, 309*a-d*, 409*a-d*, and a primary vent valve 111, 311*a-d*, 411*ab,cd*, and/or a lower vent line 123, 323*a-d*, 423*a-d*, and a lower vent valve 130, 330*a-d*, 430*a-d*.

To remove solids from the fluidized bed pressure vessel 102, 302, 402, a discharge line 106, 306*a-d*, 406*ab,cd* fluidly connects the fluidized bed pressure vessel 102, 302, 402 to the settling vessel 107, 307*a-d*, 407*a-d*. It may be desirable to minimize the length of the discharge line 106, 306*a-d*, 406*ab, cd*. In any embodiments, the discharge line 106, 306*a-d*, 406*ab,cd* may be self-draining. In other embodiments, the discharge line 106, 306*a-d*, 406*ab,cd* may be swept clean with a clean-gas purge 117, 317*a-d*, 417*ab,cd*. The clean-gas purge 117, 317*a-d*, 417*ab,cd* may be from a fresh monomer feed, inert feed, or may be recycle gas flow from the discharge of a recycle compressor (not shown), bottom head, or other higher pressure source. Some embodiments may also comprise a clean gas purge valve 122, 322*a-d*, 422*ab,cd*.

The settling vessel 107, 307*a-d*, 407*a-d* is filled with a discharge flow of a discharge fluid, preferably comprising a mixture of solids and gas. To control the discharge flow from the fluidized bed pressure vessel 102, 302, 403 to the settling vessel 107, 307*a-d*, 407*a-d*, a primary discharge valve 108, 308*a-d*, 408*ab,cd* is located along the discharge line 106, 306*a-d*, 406*ab,cd*. As the primary discharge valve 108, 308*a-d*, 408*ab,cd* is opened, the solid/gas mixture initially flows under pressure from fluidized bed pressure vessel 102, 302, 402 to the settling vessel 107, 307*a-d*, 407*a-d*. As used herein, "control" of a flow refers to the ability to start and stop the flow or regulate the subject flow. A device may be the only device controlling a flow, or there may be a number of devices that "control" a subject flow. For example, where a primary and a secondary valve "control" a subject flow, either the primary or secondary valve may close, thus stopping the flow.

Still referring to FIG. 1 (see also FIG. 3), in any embodiment herein, a vent line 109, 309*a-d*, 409*a-d* may fluidly connect the settling vessel 107, 307*a-d*, 407*a-d* to a lower pressure region, for example an upper portion of the fluidized bed pressure vessel 102, 302, 402. This vent line 109, 309*a-d*, 409*a-d* allows a flow to continue through the discharge valve after the pressure equalizes. The gases that enter the settling vessel 107, 307*a-d*, 407*a-d* travel up the vent line 109, 309*a-d*, 409*a-d* to the upper portion of the fluidized bed pressure vessel 102, 302, 402 while the solids settle in the settling vessel 107, 307*a-d*, 407*a-d*. This method maximizes the volume of solids that fill the settling vessel 107, 307*a-d*, 407*a-d* and thus minimizes the amount of gas escaping the discharge system. A primary vent valve 111, 311*a-d*, 411*ab,cd* may be located along vent line 109, 309*a-d*, 409*a-d* to control a vent flow of gas in the vent line 109, 309*a-d*, 409*a-d* between the settling vessel 107, 307*a-d*, 407*a-d* and the fluidized bed pressure vessel 102, 302. The primary vent valve 111, 311*a-d*, 411*ab,cd* may be located in the vertical piping section so that it is self-draining. In some embodiments, the primary vent valve 111, 311*a-d*, 411*ab,cd* is located close to the settling vessel 107, 307*a-d*, 407*a-d* to reduce the valved-in volume of the settling vessel/piping combination. If the primary vent valve is located close to the settling vessel 107, 307*a-d*, 407*a-d* a vent purge (not shown) of clean gas may be used to prevent material settling in the vertical section of the vent line 109, 309*a-d*, 409*a-d* from the primary vent valve 111, 311*a-d*, 411*ab,cd* to the fluidized bed pressure vessel 102, 302, 402 when the primary vent valve 111, 311*a-d*, 411*ab,cd* is closed. In some embodiments, the primary vent valve 111, 311*a-d*, 411*ab,cd* may be located at the fluidized pressure vessel 102, 302, 402. In other embodiments, the primary vent valve 111, 311*a-d*, 411*ab,cd* may be located close to the fluidized pressure vessel 102, 302, 402 and a secondary vent valve 427*a-d* (not shown in FIGS. 1 and 3) may be located in the vent line 109, 309*a-d*, 409*a-d* close to the settling vessel 107, 307*a-d*, 407*a-d*. In any of these embodiments, a vent line purge and vent line purge valve as described above may be desirable. This arrangement can decrease the valved-in volume, and may or may not require purging of the vent line 109, 309*a-d*, 409*a-d*.

Still referring to FIG. 1 (see also FIGS. 3-4), when the primary discharge valve 108, 308*a-d*, 408*ab,cd* is open, a solid gas mixture flows from the fluidized bed pressure vessel 102, 302, 402 to the settling vessel 107, 307*a-d*, 407*a-d*. Optionally, the primary vent valve 111, 311*a-d*, 411*ab,cd* is opened, allowing the gas or a gas/liquid mixture to flow back to a lower pressure region, for example, in the upper portion of the fluidized bed pressure vessel 102, 302, 402. In a fluidized bed system, the pressure differential between the bottom and top of the fluidized bed results in a flow path between a lower portion of the fluidized bed pressure vessel 102, 302, 402 to the settling vessel 107, 307a-d, 407a-d, and then up to the upper portion of the fluidized bed pressure vessel 102, 302, 402, where the pressure is lower. When the settling vessel 107, 307a-d, 407a-d is full, the primary discharge valve 108, 308a-d, 408ab,cd and primary vent valve 111, 311a-d, 411ab,cd may be closed. The settling vessel 107, 307a-d, 407a-d may be deemed filled as determined by any number of variables including, for example, a preset time, level measurement, pressure condition, change in solids concentration in the vent line 109, 309a-d, 409a-d, or any other means provided.

After the settling vessel 107, 307a-d, 407a-d fills, the solids and a portion of the gas are transferred to a transfer vessel 114, 314a-d, 414a-d located below the settling vessel 107, 307a-d, 407a-d by opening the transfer valve 118, 318a-d, 418a-d. The solid flows initially by pressure, then by gravity from the settling vessel 107, 307a-d, 407a-d to the transfer vessel 114, 314a-d, 414a-d. The transfer vessel 114, 314a-d, 414a-d may be the same and slightly larger volume than the settling vessel to make sure there is room for all of the solids in the settling vessel 107, 307a-d, 407a-d. Because solids may agglomerate, it is preferred that no solids remain in the settling vessel 107, 307a-d, 407a-d or in the transfer valve 118, 318a-d, 418a-d. To assist with efficient transfer of solids, in any embodiment, a lower vent line 123, 323a-d, 423a-d may be provided that fluidly connects the upper portion of the transfer vessel 114, 314a-d, 414a-d to the settling vessel 107, 307a-d, 407a-d. This line allows gasses in the transfer vessel 114, 314a-d, 414a-d to flow back up into the settling vessel 107, 307a-d, 407a-d while the solids flow down through the transfer valve 118, 318a-d, 418a-d.

After the solids are transferred into the transfer vessel 114, 314a-d, 414a-d, they can be transferred to downstream vessels for processing. Thus, any embodiment described herein may comprise a primary exit valve 110, 310a-d, 410a-d that controls the flow of solid and gas exiting the transfer vessel 114, 314a-d, 414a-d. The primary exit valve 110, 310a-d, 410a-d may be located, for example, directly on the outlet of the transfer vessel 114, 314a-d, 414a-d.

In any of the embodiments disclosed herein, the valves referenced are automatically actuated valves. The valves may be full port, quick acting valves such as ball, cylinder, cam, or gate valve designed for reliable, high-cycle operation. The valves may be metal seated, and/or trunnion supported ball valves. In some embodiments, the primary discharge valve 108, 308a-d, 408ab,cd and/or the primary vent valve 111, 311a-d, 411ab,cd are designed to minimize the space between the sealing element and the interior of the fluidized bed pressurized vessel 102, 302, 402. The automatically actuated valves are typically controlled by an automated control system, such as a sequence logic control system or similar system.

In any embodiment described herein, the discharge system may be absent a filter element to filter fluids exiting the settling vessel 107, 307a-d, 407a-d via significant process streams. Significant process streams are process streams exiting the settling vessel 107, 307a-d, 407a-d, for example, through the vent line 109, 309a-d, 409a-d, or crosstie lines (discussed below). Filter elements, as used herein, refers to filter elements located in the substantial process streams designed to preclude the carryover of most of the solid particles out of the settling vessel 107, 307a-d, 407a-d when the gas exits the vessel. Filter elements, as used herein, does not refer to elements used to exclude particles from non-significant streams, for example, pressure taps or analyzer taps fluidly connecting an instrument to a vessel. Filter elements, for example sintered metal filters, are typically used in some prior art systems, such as those described in U.S. Pat. No. 4,003,712.

Still referring to FIG. 1, in any embodiment described herein, a blow-off line (not shown), for example, connected vent line 109, 309a-d, 409a-d, may be provided to a flare or other system to maintain pressure stability in the discharge system. This blow-off line may be beneficial to bleed-off some of the pressure from the discharge system before the primary exit valve 110, 310a-d, 410a-d is opened. In certain embodiments, gas may be transferred from the settling vessel 107, 307a-d, 407a-d to, for example, a gas recovery system (not shown), such that the pressure of discharge system is maintained according to the requirements of a given operation.

One class of embodiments provides a discharge system for removing solids from a fluidized bed pressure vessel comprising: a settling vessel 107, 307a-d, 407a-d comprising a conical top head; a discharge line 106, 306a-d, 406ab,cd fluidly connecting a fluidized bed pressure vessel 102, 302, 402 to the settling vessel 107, 307a-d, 407a-d; a primary discharge valve 108, 308a-d, 408ab,cd that controls a discharge flow of a fluid mixture from the fluidized pressure vessel 102, 302, 402 through the discharge line 106, 306a-d, 406ab,cd to the settling vessel 107, 307a-d, 407a-d; a transfer vessel 114, 314a-d, 414a-d in fluid communication with the settling vessel 107, 307a-d, 407a-d; a transfer valve 118, 318a-d, 418a-d between the settling vessel 107, 307a-d, 407a-d and the transfer vessel 114, 314a-d, 414a-d that controls a transfer flow from the settling vessel 107, 307a-d, 407a-d to the transfer vessel 114, 314a-d, 414a-d; and a primary exit valve 110, 310a-d, 410a-d that controls an exit flow of the fluid mixture from the transfer vessel 114, 314a-d, 414a-d.

Figure 2:
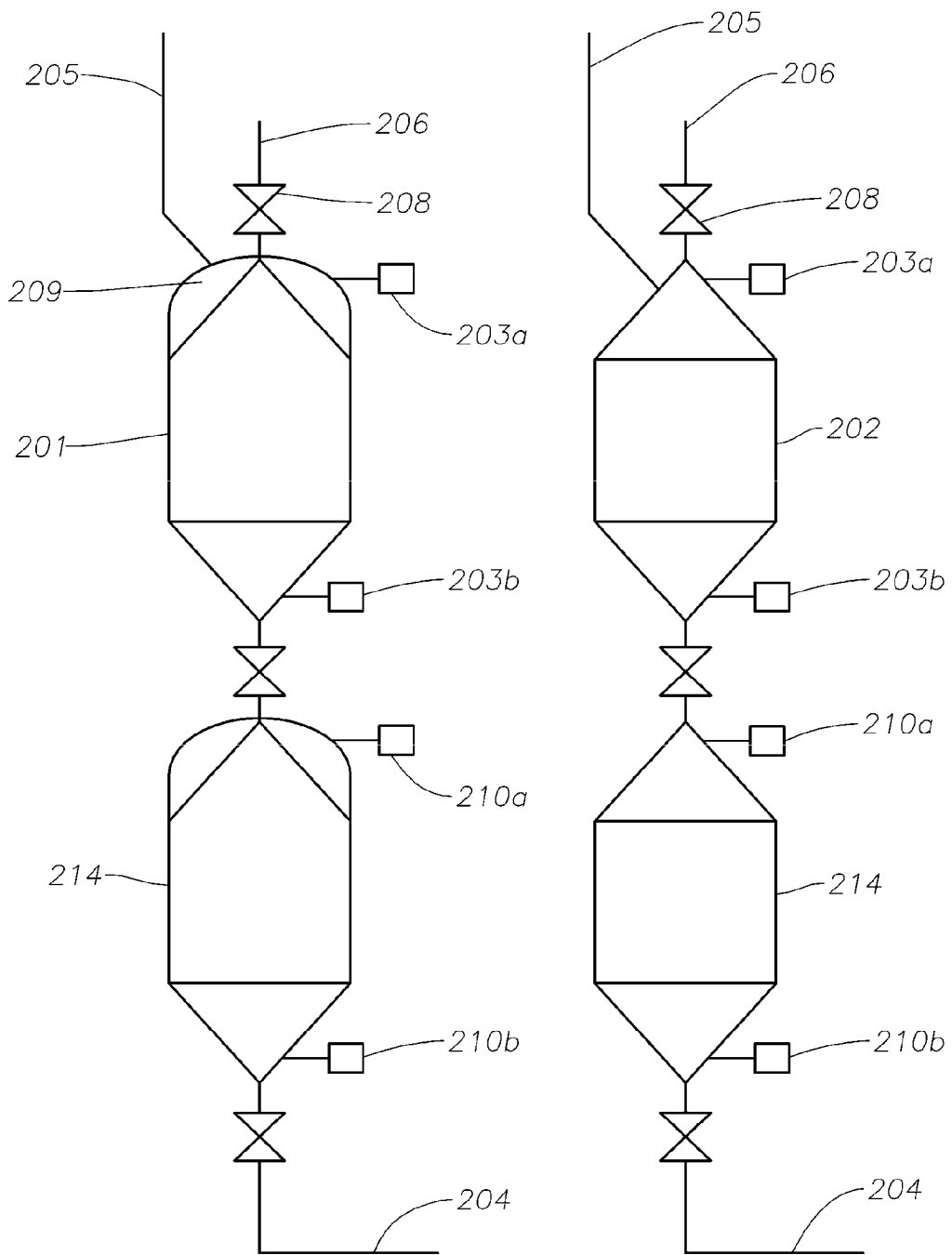
FIG. 2 is a schematic drawing of settling vessels with elliptical and conical top heads.

Referring now to FIG. 2, a cross-section drawing of a settling vessel with an elliptical top head 201 and a settling vessel with a conical top head 202 is shown. Specifically, a settling vessel with an elliptical top head 201 is shown being filled from a discharge line 206 through a discharge line valve 208. As a solid product fills the settling vessel, theoretically, areas of unfilled space 209 are created by the angle of repose of the material in the elliptical head. During vessel filling, the unfilled space 209 results in a greater volume of residual gas in the vessel, resulting in greater gas loss when the vessel is emptied. Without being bound to theory, it is believed that the volume of the unfilled space 209 in the elliptical head is less than that represented by the angle of repose of the material due to the presence of a significant amount of turbulence during filling. However, it is theorized that some portions of this theoretical void space do not fill with solids during the filling process. To reduce the unfilled volume inside the settling vessel, a conical top head may be used in accordance with any of the embodiments described herein. As illustrated, during vessel filling, the settling vessel with the conical top head 202 reduces the volume of residual gas or gas/liquid mixture in the settling vessel because the contours of the conical top head may more closely approximate the fill pattern of the solid product. Less gas volume in the settling vessel means less gas may be lost during vessel emptying. Thus, in any of the embodiments described herein, it may be beneficial to provide a settling vessel 202 conical top head to decrease the storage of residual gas and gas/liquid.

In any other embodiments described herein, the transfer vessel 214 may comprise a conical top head as described above for the settling vessel 201. The same rational described above for the settling vessel 201 applies to the transfer vessel 214.

Still referring to FIG. 2, in any embodiment described herein, the discharge system may further comprise a solids monitoring device 203a,b. The solids monitoring device 203a,b, may be any device known to one of ordinary skill in the art that detects the presence of a solid in a pressurized vessel. For example, the solids monitoring device 203a,b, may be a nuclear level detection device, tuning fork device, static probe, pressure monitor, acoustic emissions device, or entrainment device. The solids monitoring device 203a,b may be an upper solids monitoring device 203a located near the top of the settling vessel 201, 202, in the vent line 205, or any other suitable location to measure when the tank is full. Alternately, the solids measuring device may be a lower solids monitoring device 203b located near the bottom of the settling vessel 201, 202, or any other suitable location that allows the lower solids monitoring device 203b to detect when the settling vessel 201, 202 empties completely. Addition of a solids monitoring device 203a,b may allow the discharge system to detect the fill rate in a settling vessel, and adjusting the time of filling, depressurizing, repressurizing, or transferring solids out of the settling vessel such that the efficiency of the process is increased. One of ordinary skill in the art will realize that any number of fill devices may be used in a given discharge system, and may be placed in multiple locations.

Furthermore, the current invention may further comprise a solids monitoring device 210a,b as described above connected to a transfer vessel 214. The solids monitoring device may be an upper transfer tank solids monitoring device 210a located near the top of the transfer vessel or any other suitable location to measure when the tank is full. Alternately, the solids measuring device may be a lower transfer tank solids monitoring device 210b located near the bottom of the transfer vessel, in the conveying line 204, or any other suitable location that allows the solids monitoring device to detect when the transfer vessel empties completely.

Figure 3A:
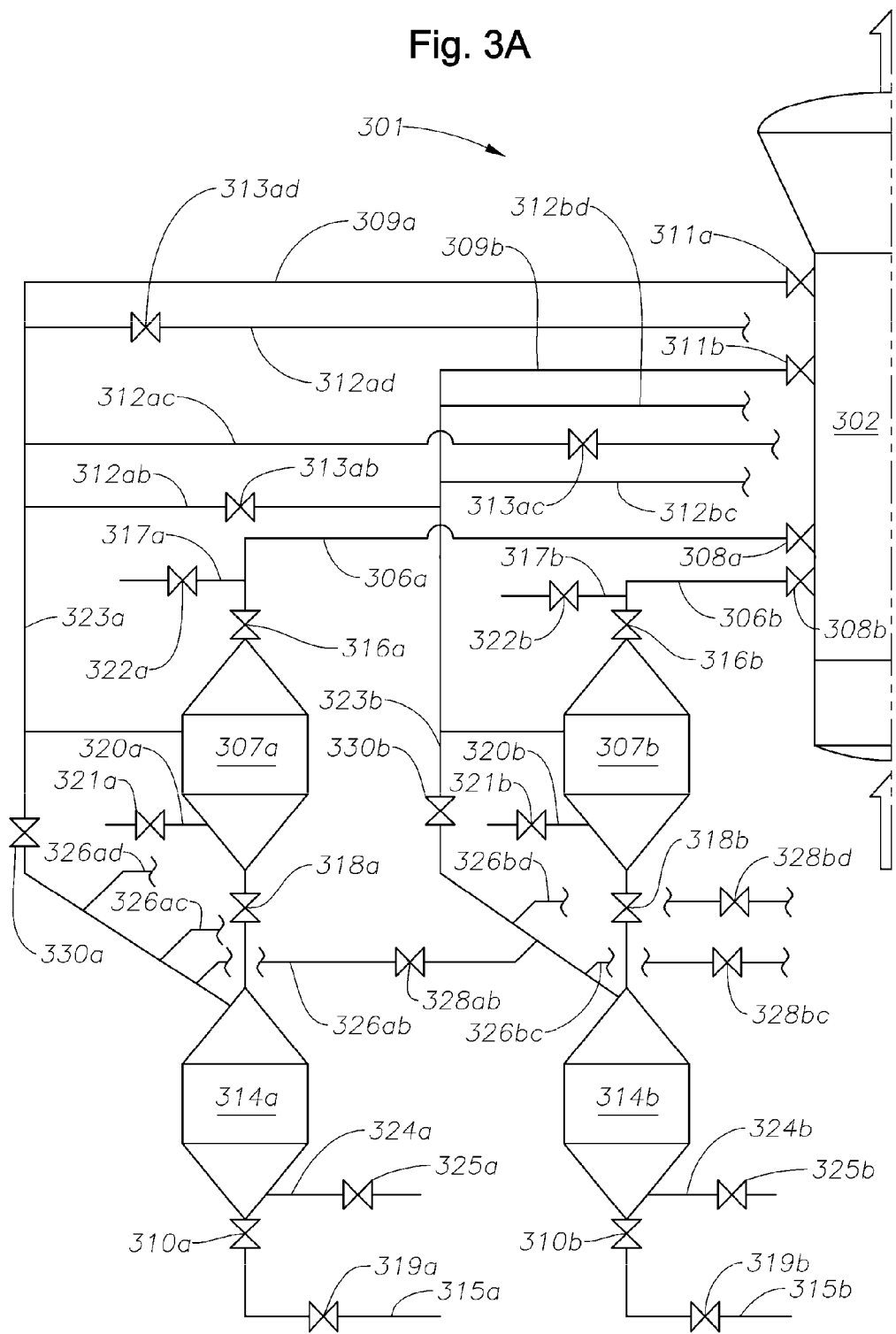
FIG. 3 contains two pages, labeled FIG. 3A and FIG. 3B, and is a schematic drawing of a multi-train discharge system.
Figure 3B:
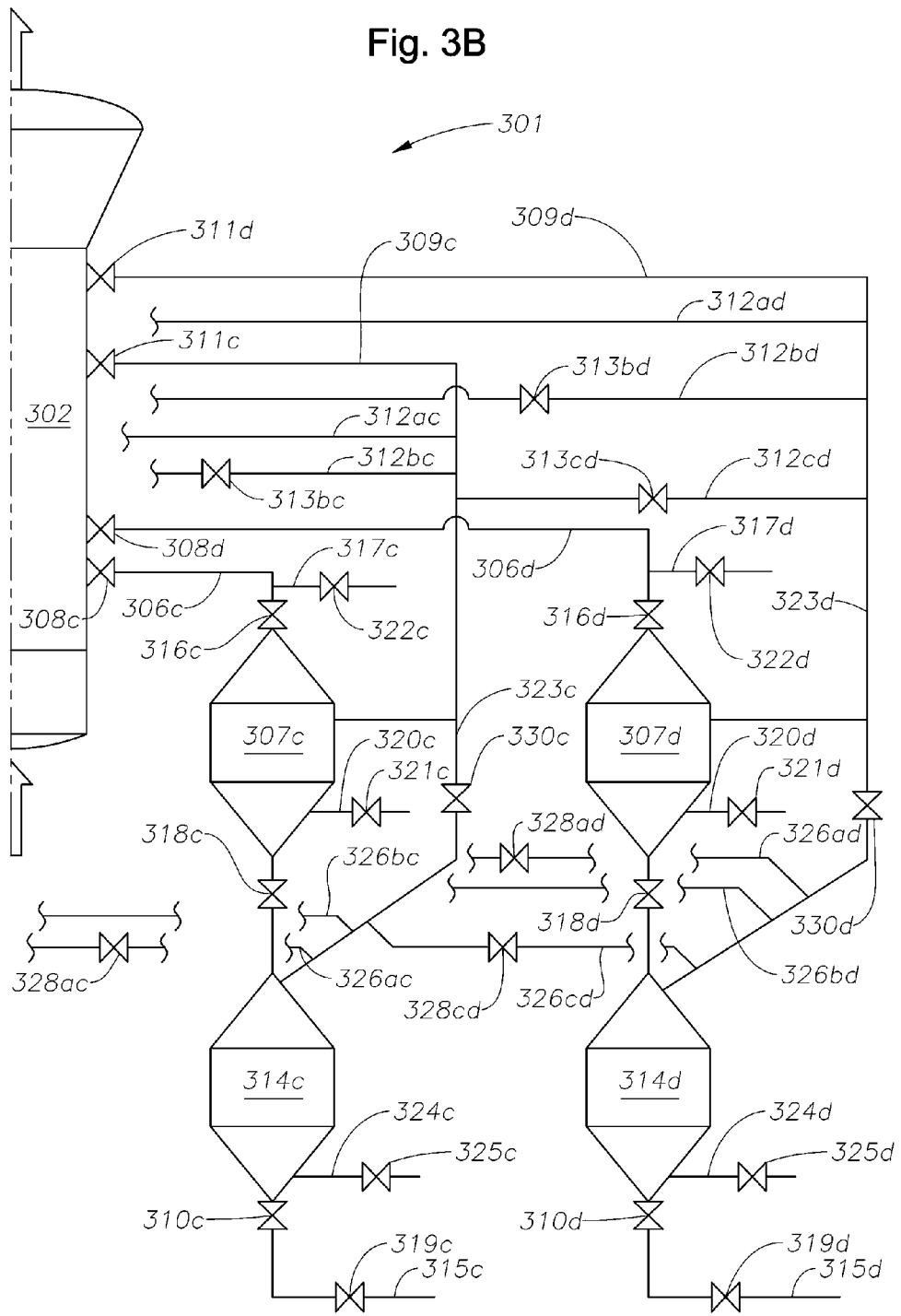

Referring now to FIG. 3 (see also FIG. 4), multiple trains of discharge vessels may be utilized to practice the current invention. For example, FIG. 3 shows four settling vessels 307a-d, 407a-d, and four transfer vessels 314a-d, 414a-d. However, it should be realized that other discharge systems may include only one or any other number of settling vessels 307a-d, 407a-d and transfer vessels 314a-d, 414a-d capable of configuration in accordance with the present disclosure. In some embodiments, the addition of more settling vessels 307a-d, 407a-d and transfer vessels 314a-d, 414a-d may increase the capacity or efficiency of gas retention. When providing a plurality of settling vessels 307a-d, 407a-d and transfer vessels 314a-d, 414a-d, the settling vessels 307a-d, 407a-d may be arranged in parallel, thus solid material flows from the fluidized bed pressure vessel 302, 402 to any one of the settling vessels 307a-d, 407a-d and then to the respective transfer vessel 314a-d, 414a-d. As used herein, arranged in parallel refers to an arrangement of settling vessels such that each settling vessel takes a mixture containing a solid material from the fluidized bed pressure vessel and passes the solid material on to downstream equipment without a substantial amount of the solid material received by one settling vessel having to flow through other settling vessels. In one preferred embodiment, each settling vessel/transfer vessel set may be operated independently of the other settling vessel/transfer vessel set.

Still referring to FIG. 3 (see also FIG. 4), in any embodiment described herein, the discharge system may comprise a secondary discharge valve 316a-d, 416a-d in series with the primary discharge valve 308a-d, 408ab,cd, wherein the primary discharge valve 308a-d, 408ab,cd and the secondary discharge valve 316a-d, 416a-d are located between the fluidized bed pressure vessel 302, 402 and the settling vessel 307a-d, 407a-d, and wherein both the primary discharge valve 308a-d, 408ab,cd and the secondary discharge valve 316a-d, 416a-d control the discharge flow to the settling vessel 307a-d, 407a-d. Adding the secondary discharge valve 316a-d, 416a-d close to the settling vessel 307a-d, 407a-d improves the discharge system efficiency, by reducing closed-valve volume. Furthermore, the secondary discharge valve 316a-d, 416a-d enables providing a clean-gas purge 317a-d, 417ab,cd of the discharge line 306a-d, 406ab,cd after the settling vessel 307a-d, 407a-d has been filled. In these embodiments, the secondary discharge valve 316a-d, 416a-d may be closed and primary discharge valve 308a-d, 408ab,cd may be opened to provide a clean-gas purge and sweep the solids from the discharge line 306a-d, 406ab,cd. The clean-gas purge 317a-d, 417ab,cd may have a clean-gas purge valve 322a-d, 422ab,cd to control the flow of clean-gas. In all embodiments disclosed herein, the primary discharge valve 308a-d, 408ab,cd, the secondary discharge valve 316a-d, 416a-d and any other valves referenced are automatically controlled and actuated valves.

In any embodiment described herein, the discharge system may also comprise a secondary exit valve 319a-d, 419a-d in series with the primary exit valve 310a-d, 410a-d, wherein the primary exit valve 310a-d, 410a-d and the secondary exit valve 319a-d, 419a-d are located downstream of the transfer vessel 314a-d, 414a-d, and wherein both the primary exit valve 310a-d, 410a-d and the secondary exit valve 319a-d, 419a-d control the exit flow to the transfer vessel 314a-d, 414a-d. Adding the secondary exit valve 319a-d, 419a-d provides an improvement in safety by providing an additional valve that can be closed between the high pressure source of the fluidized bed pressure vessel 302, 402 and a downstream receiving vessel (not shown). Adding the additional automatic valve allows a discharge vessel train to fill the settling vessel while concurrently emptying the transfer vessel. This shortens the cycle time, which allows more drops, and thus a higher discharge system capacity for a given size system.

Providing the secondary exit valve 319a-d, 419a-d fills a long felt need to shorten discharge system cycle times. In prior art systems comprising only one automatic secondary exit valve, the transfer vessel 314a-d, 414a-d had to be emptied and the primary exit valve 310a-d, 410a-d confirmed closed before the settling vessel 307a-d, 407a-d was filled. This was to make sure that at least two valves (for example, the transfer valve 318a-d, 418a-d and primary exit valve 310a-d, 410a-d, or the primary discharge valve 308a-d, 408ab,cd and transfer valve 318a-d, 418a-d) were closed to protect low pressure downstream vessels from high pressure gases potentially blowing through to the downstream vessel from the fluidized bed pressure vessel 302, 402 in the event that one valve failed open (from a valve or actuator failure, for example due to a stem failure). Dual tank product discharge systems (containing a settling vessel and a transfer vessel as disclosed in the '952 patent discussed above) have been operating since about 1981. There has been a long-felt need in the industry to decrease the cycle time of product discharge systems while retaining the safety protection provided by the dual closed valve method. Providing the secondary exit valve 319a-d, 419a-d provides the desired safety protection while decreasing the total cycle time of the system.

Still referring to FIG. 3, in any of the embodiments described herein, a dry-gas purge 320a-d (not shown in FIG. 4) may be fed to the settling vessel 307a-d. The dry-gas purge 320a-d may have a dry-gas purge valve 321a-d to control the flow of dry-gas. In some applications a fluidized bed polymerization reactor may be operated with a liquid phase present. This could be from injecting liquid feeds or recycle into the reactor or condensed mode operation where the gas composition and inlet temperature allows for condensation of heavier hydrocarbons. It is known in the art that when removing solid particles from a fluidized bed pressure vessel 302 operating in condensing or super-condensing mode, the solid particles may be saturated with liquid, and/or liquid may enter the settling tank when the filling step is executed. To facilitate the displacement of any liquids present, the dry-gas purge 320a-d may be fed into the settling vessel 307a-d during any suitable step in the process, and preferably during the filling step, more preferably during the filling step after the discharge valve 308a-d has closed, but before the primary vent valve 311a-d is closed. The dry-gas purge 320a-d may be added at a rate that does not cause fluidization in the discharge tank. In some embodiments of the invention, the dry-gas purge 320a-d is fed into the lower section of the settling vessel 307a-d. The dry gas purge 320a-d may be a gas compatible with the process, as some of this gas will be recycled up into the fluidized bed pressure vessel. In some embodiments, the dry-gas purge 320a-d may be cycle gas taken from a point in the fluidized bed process where liquids are not present, such as the outlet of the fluidized bed pressure vessel 302. In one embodiment, the dry gas is taken downstream of the compressor, which is circulating material through the fluidized bed pressure vessel, but before a cycle gas cooler where condensation may occur. In some embodiments, the dry-gas purge 320a-d may be an inert to the process, such as nitrogen in a polymerization process.

In any of the embodiment herein, a dry-gas purge as described above may be fed to a lower portion of a transfer vessel 314a-d. To facilitate the displacement of any liquids present, the dry-gas purge (not shown) may be fed into the transfer vessel 314a-d during any suitable step in the process, and preferably while the solids are transferring from the settling vessel 307a-d to the transfer vessel 314a-d or during an equalizing step.

Still referring to FIG. 3 (see also FIG. 4), any of the embodiments herein may comprise a crosstie line 312ab,bc,cd,ac,bd,ad, 412a-d that fluidly connects at least two of the settling vessels 307a-d, 407a-d together. In some embodiments, a plurality of crosstie lines 312ab,bc,cd,ac,bd,ad, 412a-d fluidly connects a plurality of settling vessels 307a-d, 407a-d together. The crosstie lines 312ab,bc,cd,ac,bd,ad, 412a-d allow the flow of gas between settling vessels 307a-d, 407a-d. The crosstie valve 313ab,bc,cd,ac,bd,ad, 413ab,cd controls a crosstie flow of fluid, typically a reactor gas mixture, through the crosstie line 312ab,bc,cd,ac,bd,ad, 412a-d. As illustrated, the crosstie lines 312ab,bc,cd,ac,bd,ad, 412a-d extend from the vent lines 309a-d, 409a-d; however, one of ordinary skill in the art will recognize that the crosstie lines 312ab,bc,cd,ac,bd,ad, 412a-d may be independent of the vent line 309a-d, 409a-d, so long as gas may flow between each of the plurality of settling vessels 307a-d, 407a-d. In one preferred embodiment, the crosstie lines are self-draining. In some preferred embodiments, the crosstie flow rate is restricted so that the solid material in the settling vessel 307a-d, 407a-d is not fluidized, which can result in excessive solid particle carryover. This restriction may be done with an orifice, converging/diverging flow nozzle, or by the use of a crosstie valve 313ab,bc,cd,ac,bd,ad, 412a-d that is a flow-controlling type. Flow-controlling-type crosstie valves may, for example, have a flow area that varies as valve stem rotates to opens the valve. In some embodiments, the flow-controlling-type valves may, for example, be an eccentric plug rotary valve, V-ball valve, butterfly valve, or other valve designed to gradually increase the open area and regulate the flow rate as the valve is opened. By using a flow-controlling-type crosstie valve, the initial flow through the crosstie line can be restricted when the crosstie valve is first opened, which is when the pressure difference between vessels is highest. This pressure differential drops over time. As the flow-controlling-type valve continues to open, the flow area of the valve increases, allowing a high flow rate to be maintained as the pressure differential drops. In prior art systems, fixed flow restriction devices were used, which resulted in the crosstie flow dropping dramatically as the pressure difference between vessels dropped.

In any embodiment herein, a lower crosstie may also be provided to improve the gas efficiency of the system. After the solids are transferred to the transfer vessel 314a-d, 414a-d, portions of the gases are removed from the interstitial voids and any free space above the solids in the transfer vessel 314a-d, 414a-d by equalizing the full transfer vessel 314a-d, 414a-d with an empty transfer vessel(s) 314a-d, 414a-d. A lower crosstie line 326ab,bc,cd,ac,bd,ad, 434a-d fluidly connects at least two transfer vessels 314a-d, 414a-d to allow the flow of gases between the vessels. A lower crosstie valve 328ab,bc,cd,ac,bd,ad, 428ab,cd controls the flow between transfer vessels 314a-d, 414a-d. For instance, a lower crosstie line 326ab fluidly connects a first transfer vessel 314a to a second transfer vessel 314b, and a first lower crosstie valve 328ab controls the flow of gas between the two vessels. In any of the embodiments, the lower crosstie valve 328ab,bc,cd,ac, bd,ad, 428ab,cd may also be a flow-controlling-type crosstie valve as described above.

Carryover of solid particles with the crosstie flow can result in solid particles, such as polymer particles, being left in the crosstie lines 312ab,bc,cd,ac,bd,ad, 412a-d. Reactive solids left in the crosstie lines 312ab,bc,cd,ac,bd,ad, 412a-d can continue to react, causing operating problems. In particular, polymer particles left in the lines can polymerize between discharge cycles and plug the crosstie line 312ab,bc,cd,ac, bd,ad, 412a-d. However, it is theorized that if the discharge cycle time is fast, the risk of continued reaction resulting in agglomeration is low and the crossties may be designed for faster transfer with instantaneous fluidization of the material in the settling vessel 307a-d, 407a-d and a resulting carryover to the receiving settling vessel.

Still referring to FIG. 3 (see also FIG. 4), solids are transferred out of the transfer vessel 314a-d, 414a-d to a downstream receiving vessel (not shown) through the conveying line 315a-d, 415a-d. Each transfer vessel 314a-d, 414a-d may have its own conveying line 315a-d 415a-d to downstream processing equipment. In any embodiment, any number of transfer vessels 314a-d, 414a-d may share a common conveying line (not shown). In the later embodiment, each settling vessel has its own primary exit valve 310a-d, 410a-d, which is opened during the transfer.

Still referring to FIG. 3, while any granular solid transfer method may be used, one preferred method uses a conveying assist gas fed through a conveying assist gas line 324a-d and controlled by a conveying assist valve 325a-d. The conveying assist gas is preferably injected into the lower part of the settling vessel 307a-d. The conveying assist gas is preferably an inert, a dry-gas purge, a recycled gas, nitrogen, or a byproduct gas from downstream operations, such as vent recovery.

Still referring to FIG. 3 (see also FIG. 4), one class of embodiments provides a discharge system comprising: a settling vessel 307a-d, 407a-d; a discharge line 306a-d, 406ab, cd fluidly connecting a fluidized bed pressure vessel to the settling vessel; a discharge valve 308a-d, 408ab,cd that controls a discharge flow of a fluid mixture from the fluidized pressure vessel through the discharge line to the settling vessel; a transfer vessel 314a-d, 414a-d that receives solid particles from the settling vessel; a transfer valve 318a-d, 418a-d between the settling vessel and the transfer vessel that controls a transfer flow from the settling vessel to the transfer vessel; a primary exit valve 310a-d, 410a-d that controls an exit flow of the fluid mixture from the transfer vessel; a secondary exit valve 319a-d, 419a-d that controls the exit flow of the fluid mixture from the transfer vessel in addition to the primary exit valve; a means to detect an abnormal condition in the discharge system; and a means to close the secondary exit valve upon detection of the abnormal condition.

An abnormal condition may be any condition that warrants the termination of flow from the transfer vessel to a downstream receiving vessel. An abnormal condition may be, for example, high pressure, high flow, high or low temperature, high vessel stress, incorrect valve position, or incorrect actuator position. In some embodiments, the secondary exit valve may be a normally open valve. In some embodiments, the secondary exit valve may close within about 5, or about 2.5 seconds of detecting an abnormal condition.

A means to detect an abnormal condition may be any means known to one of skill in the art for detecting the parameter selected for monitoring. A means to detect an abnormal condition may comprise, for example, an automated control system and a device to detect the state of a process parameter. In some embodiments, the means to detect an abnormal condition may comprise, for example, an automated control system that receives a signal from a pressure detection device, a flow detection device, a temperature detection device, a vessel stress detection device, a valve position detection device, or a valve actuator position detection device.

A means to close the secondary exit 319a-d, 419a-d valve upon detection of the abnormal condition may be any means known to one of skill in the art for analyzing a process to determine when an abnormal condition has occurred, and sending a signal to close an automated valve. In some embodiments, the means to close the secondary exit valve 319a-d, 419a-d upon detection of the abnormal condition may include, for example, an automated control system that monitors a process parameter, for example, a pressure, flow, temperature, vessel stress, valve position, or valve actuator position, may determine when that process parameter is outside of the acceptable values, and provide a signal to the secondary exit valve 319a-d, 419a-d to close. As previously discussed, all valves referenced herein are automatically actuated valves. Thus, as used herein, the secondary exit valve 319a-d, 419a-d refers to the valve/actuator combination.

Figure 4A:
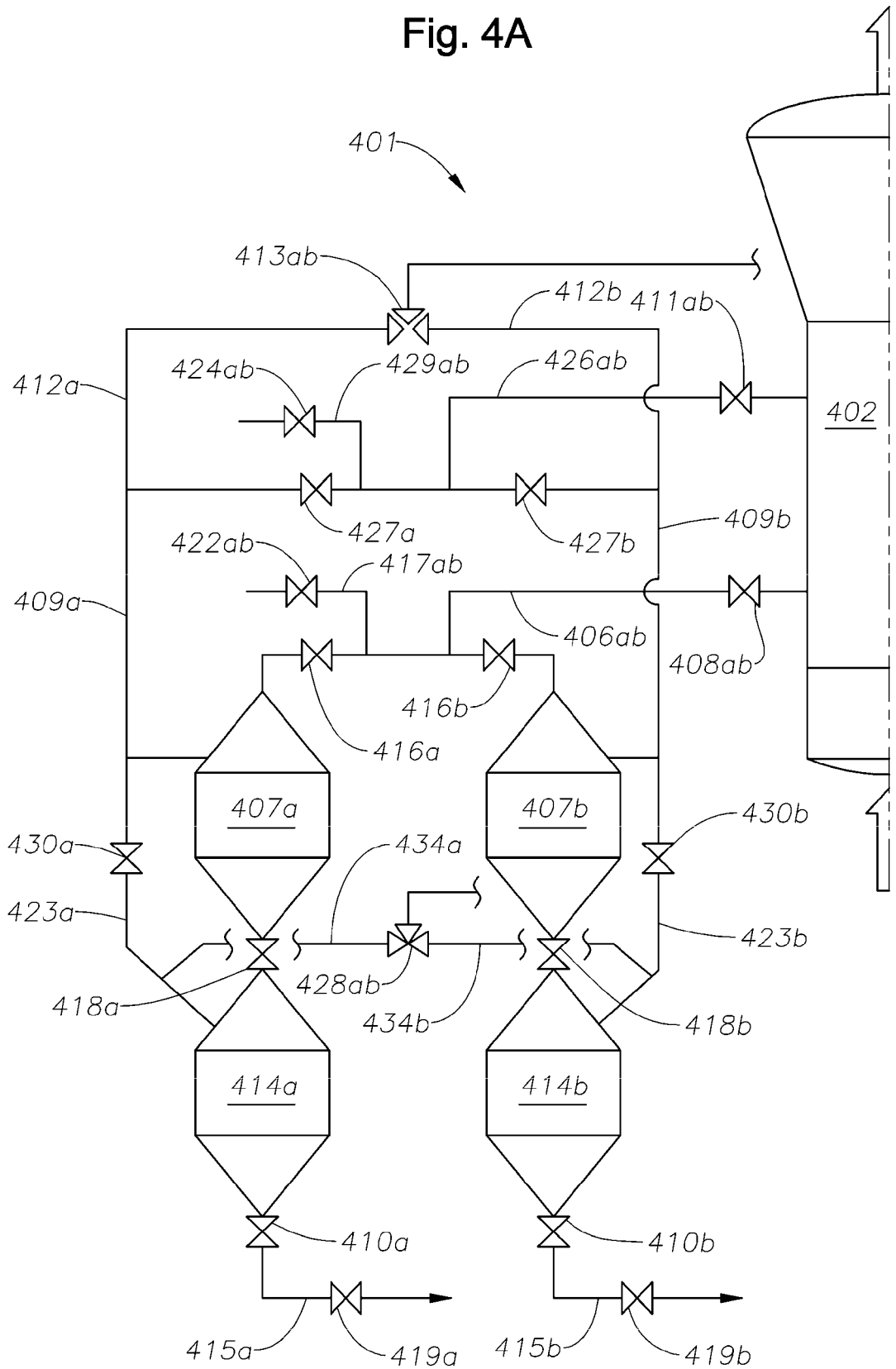
FIG. 4 contains two pages, labeled FIG. 4A and FIG. 4B, and is a schematic drawing of an alternative version of a multi-train discharge system.
Figure 4B:
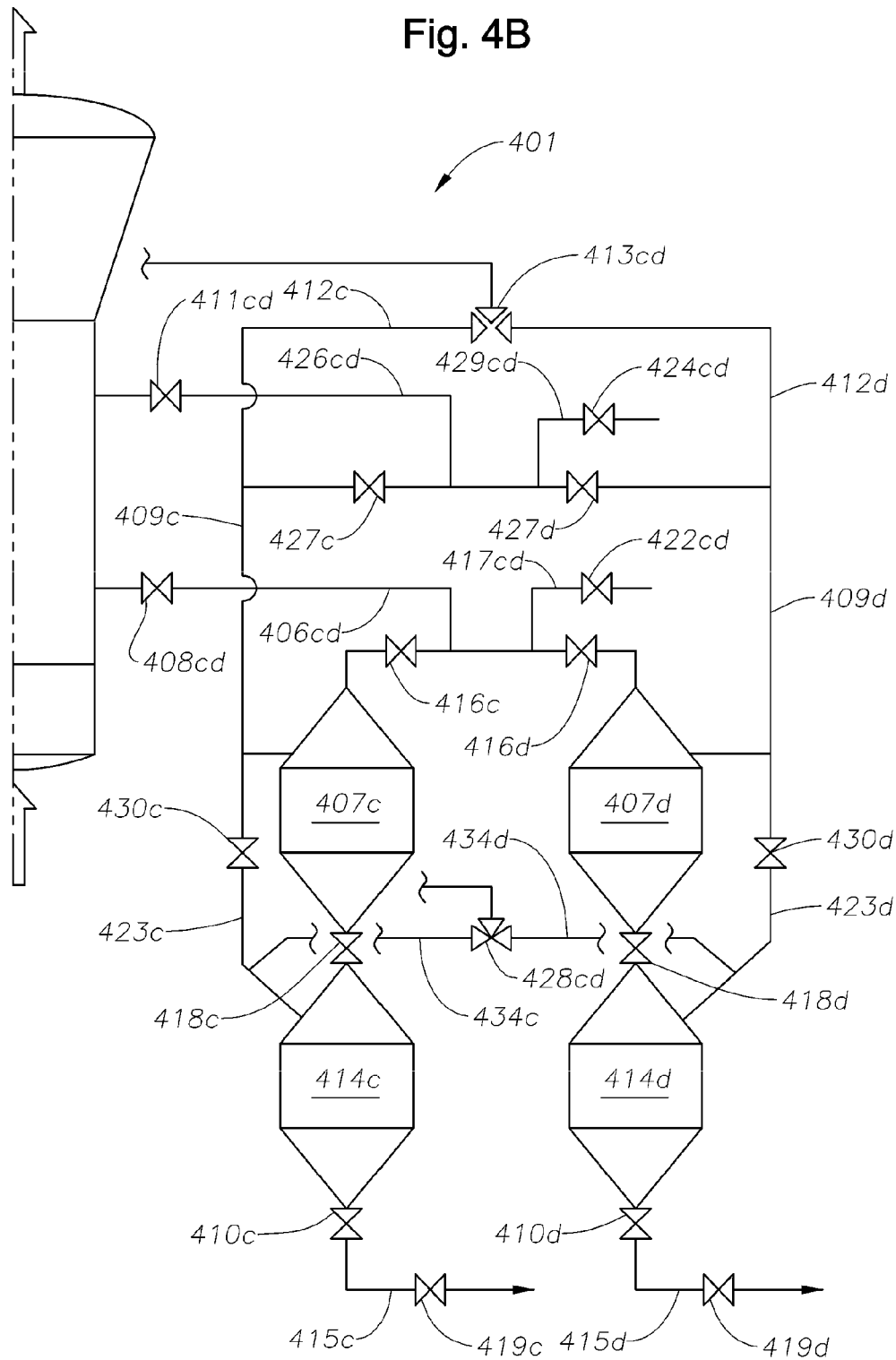

Referring now to FIG. 4, in some embodiments, the connections between the fluidized bed pressure vessel 402 and the plurality of settling vessels 407a-d, as well as the connections between the plurality of settling vessels 407a-d may be reduced as compared to the embodiments shown in FIG. 3. Specifically, at least two of the plurality of settling vessels 407a-d may share a discharge line 406ab,cd and one primary discharge valve 408ab,cd. The grouping of the plurality of settling vessels 407a-d into at least pairs decreases the amount of connections required to transfer solids from the fluidized bed pressure vessel 402. Additionally, a secondary discharge valve 416a-d may be added to control the flow of solids between the fluidized bed pressure vessel 402 and individual settling vessels 407a-d. For example, some embodiments may comprise at least two secondary discharge valves 416a-b and at least two settling vessels 407a-b, wherein each secondary discharge valve 407a-b controls the flow to one of the settling vessels 407a-b, and wherein one primary discharge valve 408ab,cd is in fluid communication with the at least two secondary discharge valves 416a-d and the at least two settling vessels 407a-d, such that the one primary discharge valve 408ab,cd, in combination with the at least two secondary discharge valves 416a-b, controls the discharge flow to each of the at least two settling vessels 407a-d. In short, at least two settling vessels 407a-d are fluidly connected to the fluidized bed pressure vessel 402 through the one primary discharge valve 408ab,cd.

Still referring to FIG. 4, to reduce the number of connections necessary to transfer gas between the fluidized bed pressure vessel 402 and the settling vessels 407a-d, some embodiments of the invention tie at least two vent lines 409a-d together to route the process flow through a common vent line 426ab,cd and one primary vent valve 411ab,cd. In some embodiments there may be least two secondary vent valves 427a-d in series with one primary vent valve 411ab,cd. Thus, for example, for fluid to flow between the fluidized pressure vessel 402 and the settling vessel 407a, both the primary vent valve 411ab and one secondary vent valve 427a must be open, while the other secondary vent valve 427b is closed. Thus, this embodiment of the invention comprises at least two secondary vent valves 427a-d and at least two settling vessels 407a-d, wherein each secondary vent valve 427a-d controls the vent flow between the upper portion of the fluidized bed pressure vessel 402 and one settling vessel 407a-d, and wherein one primary vent valve 411ab,cd is in fluid communication with the at least two secondary vent valves 427a-d and the at least two settling vessels 407a-d, such that the one primary vent valve 411ab,cd, in combination with the at least two secondary vent valves 427a-d, controls the vent flow between the upper portion of the fluidized bed pressure vessel 402 and each of the at least two settling vessels 407a-d. Some embodiments further comprise a vent-line purge 429ab,cd and a vent line purge valve 424ab, cd to sweep any solid particles in the common vent line 426ab,cd into the fluidized bed pressure vessel 402. The vent line purge gas may be a fresh monomer feed, inert feed, or may be recycle gas flow from the discharge of a recycle compressor (not shown), bottom head, or other pressure source.

Still referring to FIG. 4, to reduce the number of connections necessary to transfer gas between the settling vessels 407a-d, in any embodiments herein, the discharge system 401 may comprise a crosstie valve 413ab,cd that is a multi-port valve. The multi-port crosstie valve 413ab,cd may control the flow between at least three settling vessels 407a-d, allowing the transfer of gas there between. As illustrated in FIG. 4, a first multi-port crosstie valve 413ab may control flow between a first settling vessel 407a and a second settling vessel 407b, and may control the flow from the first settling vessel 407a or the second settling vessel 407b to a third settling vessel 407c or a fourth settling vessel 407d via connection to a second multi-port crosstie valve 413cd. The multi-port valve 413ab,cd may be configured to allow the transfer of gas between any of the settling vessels 407a-d. While this embodiment illustrates a discharge system 401 with four settling vessels 407a-d and two multi-port crosstie valves 413ab,cd, it should be realized that the number of settling vessels and multi-port valves may vary as required by different discharge systems. For example, an alternate discharge system may be foreseen wherein four vessels are connected by one multi-port crosstie valve 413ab,cd, or wherein any number of vessels are connected by any number of multi-port crosstie valves. Additionally, the number of ports on the multi-port crosstie valves 413ab,cd may vary such that in certain embodiments, a single multi-port crosstie valve 413ab,cd may accept vent lines from any number of settling vessels.

Still referring to FIG. 4, to reduce the number of connections necessary to transfer gas between the transfer vessels 414a-d, in any embodiment herein, the discharge system 401 may comprise a lower crosstie valve 428ab,cd that is a multi-port valve. The lower multi-port crosstie valve 428ab,cd can control the flow from at least three transfer vessels 414a-d, allowing the transfer of gas there between. As illustrated in FIG. 4, a first lower multi-port crosstie valve 428ab may control flow between a first transfer vessel 414a and a second transfer vessel 414b, and may control the flow from the first transfer vessel 414a or the second transfer vessel 414b to a third transfer vessel 414c or a fourth transfer vessel 414d via a connection to a second lower multi-port crosstie valve 428cd. The lower multi-port crosstie valves 428ab,cd may be configured to allow the transfer of gas between any two of the transfer vessels 414a-d. While this embodiment illustrates a discharge system 401 with four transfer vessels 414a-d and two lower multi-port crosstie valves 428ab,cd, it should be realized that the number of transfer vessels and lower multi-port crosstie valves 428ab,cd may vary as required by different discharge systems.

Referring again to FIG. 4, one class of embodiments comprises: at least three settling vessels 407a-d arranged in parallel; a discharge line 406ab,cd fluidly connecting a fluidized bed pressure vessel 402 to at least one of the at least three settling vessels 407a-d; a primary discharge valve 408ab,cd that controls a discharge flow of a fluid mixture from the fluidized pressure vessel 402 through the discharge line 406ab,cd to at least one of the at least three settling vessels 407a-d; a vent line 409a-d fluidly connecting an upper portion of the fluidized bed pressure vessel 402 and at least one of the at least three settling vessels 407a-d; a primary vent valve 411ab,cd that controls a vent flow through the vent line 409a-d; at least three crosstie lines 412a-d fluidly connecting the at least three settling vessels 407a-d; a crosstie valve 413ab,cd that controls a crosstie flow through the at least three crosstie lines 412a-d, wherein the crosstie valve 413ab,cd is a multi-port valve; at least three transfer vessels 414a-d in fluid communication with the at least three settling vessels 407a-d; at least three transfer valves 418a-d between the at least three settling vessels 407a-d and the at least three transfer vessels 414a-d control a plurality of transfer flows from the at least three settling vessels 407a-d to the at least three transfer vessels 414a-d; a lower crosstie line 434a-d fluidly connecting at least two of the at least three vessels 407a-d; a lower crosstie valve 428ab,cd that controls a lower crosstie flow through the lower crosstie line 434a-d; and at least three primary exit valves 410a-d that control a plurality of exit flows of the fluid mixture from the at least three transfer vessels 414a-d.

In another embodiment, the discharge system comprises at least three lower crosstie lines 434a-d, wherein a lower crosstie valve 428ab,cd is a multi-port valve that controls the lower crosstie flow through the at least three lower crosstie lines 434a-d.

Still referring again to FIG. 4, in some embodiments, the discharge system may comprise at least four settling vessels 407a-d; at least four crosstie lines 412a-d; a first set of crosstie lines comprising a first of the at least four crosstie lines 412a-d and a second of the at least four crosstie lines 412a-d; a second set of crosstie lines comprising a third of the at least four crosstie lines 412a-d and a fourth of the at least four crosstie lines 412a-d; and at least two multi-port valves 413ab, 413cd, wherein the at least two multi-port valves fluidly connect the first set of crosstie lines to the second set of crosstie lines.

Again referring to FIG. 4, in another embodiment, the discharge system may comprise at least four transfer vessels 414a-d; at least four lower crosstie lines 434a-d; a first set of lower crosstie lines comprising a first of the at least four lower crosstie lines 434a-d and a second of the at least four lower crosstie lines 434a-d; a second set of lower crosstie lines comprising a third of the at least four lower crosstie lines 434a-d and a fourth of the at least four lower crosstie lines 434a-d; and at least two lower multi-port valves 428ab,cd, wherein the at least two lower multi-port valves fluidly connect the first set of lower crosstie lines to the second set of lower crosstie lines.

Now referring to FIG. 5, an order of operation for a discharge system in accordance with an embodiment of the present invention is shown. The discharge system may alternate sequentially between any one of seven steps. While the embodiment described below provides seven steps of operation, it should be realized that according to the requirements of a given discharge system, some discharge systems will have less than seven steps of operation, while other discharge systems will have more than seven steps of operation.

Generally, FIG. 5 describes the steps of operation that a single set of discharge vessels (for example a first settling vessel and a first transfer vessel) may undergo during one cycle. Specifically, a cycle comprises filling a settling vessel 510, equalizing the settling vessel 520, transferring solids to a transfer vessel 530, re-equalizing the settling vessel 540, equalizing the transfer vessel 550, emptying the transfer vessel 560, and re-equalizing the transfer vessel 570. Clearly, some of the equalizing and re-equalizing steps may be skipped to decrease cycle time. For instance, the equalizing the settling vessel step 520 could be skipped, in which case there would be no re-equalizing the settling vessel step 540.

Still referring to FIG. 5, one class of embodiments provides a method for removing a solid from a fluidized bed pressure vessel comprising the steps of: providing a discharge system comprising a plurality of settling vessels and a plurality of transfer vessels, wherein at least one of the at least three settling vessels comprises a conical top head; filling a first settling vessel 510 of the plurality of settling vessels with a mixture from a fluidized bed pressure vessel, wherein the mixture comprises a solid and a pressurized gas; equalizing the first settling vessel 520, wherein a first portion of pressurized gas is transferred from the first settling vessel to at least one of the plurality of settling vessels that is not the first settling vessel; transferring 530 the solid and a second portion of pressurized gas from the first settling vessel to a first transfer vessel; re-equalizing the first settling vessel 550, wherein a return pressurized gas is transferred from at least one of the plurality of settling vessels that is not the first settling vessel to the first settling vessel; equalizing the first transfer vessel 540 with a second transfer vessel, wherein a third portion of the pressurized gas is transferred from the first transfer vessel to at least one of the plurality of transfer vessels that is not the first transfer vessel; emptying the first transfer vessel 560; and re-equalizing the first transfer vessel 570, wherein a return transfer gas is transferred from at least one of the plurality of transfer vessels that is not the first transfer vessel to the first transfer vessel.

Referring to the steps of FIG. 5 and the embodiments of FIG. 3, the process will be described, for example purposes, wherein a first settling vessel 307a and a first transfer vessel 314a are stepping through the cycle. Initially, during the tank filling step 510, primary discharge valve 308a and primary vent valve 311a may be opened, and a solid/gas mixture may flow into a first settling vessel 307a, as described herein above. After the completion of the filling step 510, the primary discharge valve 308a and the primary vent valve 311a are closed.

During the equalizing the settling vessel step 520, a first portion of pressurized gas is transferred from the first settling vessel to at least one of the plurality of settling vessels that is not the first settling vessel. For example, a first crosstie valve 313ab may be opened fluidly connecting the first settling vessel 307a and a second settling vessel 307b. Gas will flow from the higher pressure of the first settling vessel 307a to the lower pressure of the second settling vessel 307b. Upon depressurization of the first settling vessel, the second settling vessel 307b may contain more gas because it is empty of solids, and the first settling vessel 307a has a portion of its gas capacity displaced by the solids contained therein. After this first depressurization, the settling vessel 307a may be further depressurized by equalizing with a third settling vessel 307c by opening a second crosstie valve 313ac connecting the first settling vessel 307a and a third settling vessel 307c. Gas will flow from the higher pressure of the first settling vessel 307a to the lower pressure of the second settling vessel 307c. This process may be repeated any number of times depending of the number of settling vessels contained in the discharge system. Thus, equalizing the settling vessel may comprise a plurality of depressurizing steps wherein the first settling vessel is fluidly connected to a plurality of settling vessels that are not the first settling vessel.

In certain embodiments, as the first settling vessel 307a and the second settling vessel 307b are being equalized, equalization may occur between a fourth settling vessel 307d that is solid full and a third settling vessel 307c that is empty.

Continuing the example sequence, during the transferring solids to the transfer vessel step 530, which occurs after the equalizing the settling vessel step 520, a first transfer valve 318a opens to allow solids to drop from the first settling vessel 307a to the first transfer vessel 314a. A first lower vent valve 330a also opens to allow gases to vent from the first transfer vessel 314a back up into the first settling vessel 307a. A second portion of the pressurized gas may be carried from the settling vessel 307a into the first transfer vessel 314a with the solids. After the transferring solids to the transfer vessel step 530 is complete, the first transfer valve 318a and the first lower vent valve 330a close and the cycle continues to the equalizing the transfer vessel step 540, and the re-equalizing the settling vessel step 550, which may occur at least partially concurrently.

During the equalizing the transfer vessel step 540, a third portion of pressurized gas is transferred from the first transfer vessel 314a to at least one of the plurality of transfer vessels that is not the first transfer vessel. For example, a first lower crosstie valve 328ab may open connecting the first transfer vessel 314a and a second transfer vessel 314b. Gas will flow from the higher pressure of the first transfer vessel 314a to the lower pressure of the second transfer vessel 314b. After this first depressurization, the transfer vessel 314a may be further depressurized by equalizing with a third transfer vessel 314c by opening a second lower crosstie valve 328ac connecting the first transfer vessel 314a and a third transfer vessel 314c. This process may be repeated any number of times depending of the number of transfer vessels contained in the discharge system. Thus, equalizing the transfer vessel may comprise a plurality of depressurizing steps wherein the first transfer vessel is fluidly connected to a plurality of transfer vessels that is not the first transfer vessel.

During the re-equalizing the settling vessel step 550, the first settling vessel 307a is re-pressurized from at least one of the plurality of settling vessels 307b-d that is not the first settling vessel. For example, opening the crosstie valve 313ab will allow a return pressurized gas to flow from the second settling vessel 307b, which has been previously filled with solid particles and is at high pressure, into the first settling vessel 307a. During the re-equalizing the settling vessel step 550, the first settling vessel 307a may be empty and the second settling vessel 307b may be granular solid full and at a relatively high pressure. Thus, while the first settling vessel 307a is in the re-equalizing the settling vessel step 550, the second settling vessel 307b may be in the equalizing the settling vessel step 520. These re-pressuring steps may be repeated any number of times during the re-equalizing the settling vessel step 550 depending of the number of settling vessels contained in the discharge system. Thus, the re-equalizing the settling vessel step 550 may comprise a plurality of re-pressurizing steps wherein the first settling vessel is fluidly connected to a plurality of settling vessels that are not the first settling vessel.

As used in this application, "equalizing" or "re-equalizing" refers to the transfer of a portion of gas from one vessel to another. The pressure may be allowed to substantially equalize between the vessels, or the controlling valve (a crosstie valve 313ab,bc,cd,ac,bd,ad or a lower crosstie valve 328ab,bc,cd,ac,bd,ad) may close before the pressures equalize between the two vessels.

The emptying the transfer vessel step 560 occurs after the transferring solids to the transfer vessel step 530, and may occur after the equalizing the transfer vessel step 540. Continuing with the example, during the emptying the transfer vessel step 560, a primary exit valve 310a opens to allow the solids and any remaining gasses to be conveyed to a downstream vessel. If the system includes a secondary exit valve 319a, it must also be open to allow the transfer. By the emptying step 560, the pressure has been reduced to a level substantially lower than that in the fluidized bed pressure vessel 302. Volatile materials absorbed in the solids may have flashed as the pressure was reduced in each step. As such, the product of the flash may have been recovered to other vessels as transferred gas. Thus, the first transfer vessel 314a may be emptied of solids with minimal removal of gas or liquid from the discharge system 301.

Still referring to FIGS. 5 and 3, partially contemporaneous with the emptying step 560 of one set of discharge vessel, another set of discharge vessel may be filling. For example, the first settling vessel 307a may be emptying while a third transfer vessel 314c is filling.

During the emptying phase, the first transfer vessel 314a is isolated from other vessels in the discharge system 301. While emptying the first transfer vessel 314a, the first primary discharge valve 308a is closed, the first transfer valve 318a is closed, all lower crosstie valves 328ab,bc,cd,ac,bd,ad fluidly connecting the first transfer vessel 314a to other transfer vessels 314b,c,d may be closed, and primary exit valve 310a is opened, allowing the solid/gas mixture may be discharged from the discharge system. As the solid/gas mixture exits discharge system, the solids may be transferred to a downstream vessel. It should be noted that while the first transfer vessel 314a is emptying, the corresponding first settling vessel 307a may be receiving gas from another settling vessel 307b, c, or d.

Continuing with the example, after the first transfer vessel 314a is emptied, the first transfer vessel 314a is re-pressurized in the re-equalizing the transfer vessel step 570. During this step, the first transfer vessel 314a is re-pressurized from at least one of the plurality of transfer vessels that is not the first transfer vessel (314 b-d). For example, the first transfer vessel 314a may undergo re-pressurization from the second transfer vessel 314b by opening the first lower crosstie valve 328ab. During the re-equalizing the transfer vessel step 570, the first transfer vessel 314a is empty and the second transfer vessel 314b may be granular solid full and at a medium pressure. Thus, while the first transfer vessel 314a is in the re-equalizing the settling vessel step 570, the second transfer vessel 314b may be in the equalizing the transfer vessel step 540. These re-pressuring steps may be repeated any number of times during the re-equalizing the transfer vessel step 570 depending of the number of transfer vessels contained in the discharge system. Thus, the re-equalizing the transfer vessel step 570 may comprise a plurality of re-pressurizing steps wherein the first transfer vessel is fluidly connected to a plurality of transfer vessels that are not the first transfer vessel.

In the embodiment described above, upon the completion of steps 510 through 570, the process may repeat. Thus, the primary vent valve 311a and primary discharge valve 308a may then be opened and gas in the first settling vessel 307a will be pushed back into the fluidized bed pressure vessel 302.

Any number of settling vessels 307a-d including discharge systems with two, three, four, or more settling vessels 307a-d may be utilized in the current invention. Additionally, the steps of vessel filling, equalizing, emptying, and re-equalizing should be viewed as one illustrative method of practicing the disclosed discharge system. Alternate methods of practice, as would be obvious to one of ordinary skill in the art may be foreseen, wherein, for example, the order of operations are modified, additional operations are added, or the discharge system is otherwise expanded.

Now referring to the steps of FIG. 5 and the embodiments of FIG. 4, some embodiments may comprises more than two settling vessels 407a-d and a multi-port crosstie valve 413ab, cd. After the completion of filling step 510, the first settling vessel 407a enters into the equalizing the settling vessel step 520. For example, during this step, the pressure in the first settling vessel 407a may be equalized with a second settling vessel 407b by aligning a first multi-port crosstie valve 413ab to fluidly connect the first settling vessel 407a and the second settling vessel 407b (occurring after the filling step as illustrated in FIG. 5). In certain embodiments, the pressure in settling vessel 407a may be further equalized by aligning the first multi-port crosstie valve 413ab to fluidly connect the first settling vessel 407a and a third settling vessel 407c, and/or a fourth settling vessel 407d.

In an alternate embodiment of the above step, the first multi-port crosstie valve 413ab may remain closed during the first depressurizing step, thereby isolating the first settling vessel 407a and the second settling vessel 407b from the rest of discharge system 401. Subsequently, a first secondary vent valve 427a and a second secondary vent valve 427b may be opened to allow the flow of gas between the first settling vessel 407a and the second settling vessel 407b.

Still referring to FIG. 5 and FIG. 4, some embodiments may comprise more than two transfer vessels 414a-d and a lower multi-port valve 428ab,cd. In these embodiments, the equalizing the transfer vessel step 560 involves aligning a first lower multi-port crosstie valve 428ab to fluidly connect the first transfer vessel 414a and the second transfer vessel 414b. In certain embodiments, the pressure in transfer vessel 414a may be further lowered through equalization by aligning the first lower multi-port crosstie valve 428ab to fluidly connect the first transfer vessel 414a and a third transfer vessel 414c, and/or a fourth transfer vessel 414d.

Similarly, the first transfer vessel 414a is re-pressurized in the re-equalizing the transfer vessel step 570 using the first lower multi-port crosstie valve 428ab to fluidly connect the first transfer vessel 414a and the second transfer vessel 414b. In certain embodiments, the pressure in transfer vessel 414a may be further raised through re-equalization by aligning the first lower multi-port crosstie valve 428ab to fluidly connect the first transfer vessel 414a and a third transfer vessel 414c and/or a fourth transfer vessel 414d.

Still referring to FIG. 4, the valved-in volume not filled with a solid after the filling step may be minimized by providing a secondary discharge valve 416a-d as described above and adding a step of clean-gas purging (not shown in FIG. 5) the discharge piping. The step of clean-gas purging the discharge piping comprises the steps of: closing the primary discharge valve 408ab,cd, and the primary vent valve 411ab,cd after the filling step; pausing a short time to allow resin entrained in the vent line 409a-d and the discharge line 406ab,cd to settle back into the settling vessel 407a-d after the filling step; closing the secondary discharge valve 416a-d and a secondary vent valve 427a-d after the pausing step; and opening the primary discharge valve 408ab,cd, the primary vent valve 411ab,cd, a clean-gas purge valve 422ab,cd, and a vent line purge valve 424ab,cd after closing the secondary discharge valve 416a-d to allow the purging gas to sweep the discharge line 406ab,cd and the common vent line 426ab,cd to clear of any residual solid particles from the lines. As used herein, pausing a short time means pausing a period of time from about 1 second to about 1 minute, more preferably from about 1 to about 15 seconds, and even more preferably from about 1 to about 5 seconds. These valves may be left open, or closed when the line purging is complete in order to minimize the use of the purging gas. In some embodiments, each settling vessel 407a-d will have a vent line purge, and vent line purge valve, whereas in other embodiments, at least two settling vessels will have a single vent line purge 429ab,cd, and vent line purge valve 424ab,cd.

In other embodiments, the primary discharge valve 408ab, cd closes at the end of the filling step, and the secondary discharge valve 416a-d stays open until at least a portion of the solids have transferred to the transfer vessel 414a-d. This allows any solids that may be trapped in the ball of the secondary discharge valve 416a-d to drop into the settling vessel 407a-d as solids transfer to the transfer vessel 414a-d. In this embodiment, the secondary discharge valve 416a-d closes a short period of time after the transfer to the transfer vessel 414a-d begins.

In the above described embodiments of the present disclosure, upon the completion of the above steps 510 through 570, the process may repeat. Additionally, the steps of vessel filling, depressurizing, emptying, and repressurizing should be viewed as an illustrative method of practicing the disclosed discharge system. Alternate methods of practice, as would be obvious to one of ordinary skill in the art may be foreseen, wherein, for example, the order of operations are modified, additional operations are added, or the discharge system is otherwise expanded.

As may be seen from the above described discharge system, each settling vessel in the discharge system may be in a different phase at any given time. The more overlap between the phases of operation, the faster the discharge valve cycle time. As such, in certain embodiments, it is foreseeable that each settling vessel may be in a phase of operation corresponding to a specific phase of operation of at least one of the other settling vessels in the discharge system.

It is desirable to prevent high pressure gas from passing from the fluidized bed pressure vessel to a receiving vessel, which is typically a lower pressure rated vessel located downstream of the transfer vessel. Thus, in any embodiment of the methods herein, there may be logic steps in place to assure that there is always at least two valves closed between the fluidized bed pressure vessel and a downstream vessel. As used herein, the receiving vessel may be any vessel that is downstream of any transfer vessel.

Referring to FIGS. 3 & 4, in any embodiments described herein, the discharge system may comprises a secondary exit valve 319a-d, 419a-d and the method may comprise the step of closing the secondary exit valve 319a-d, 419a-d automatically when an abnormal condition is detected. An abnormal condition may be any condition that warrants the termination of flow from the transfer vessel to a downstream receiving vessel. An abnormal condition may be, for example, high pressure, high flow, high or low temperature, high vessel stress, incorrect valve position, or incorrect actuator position. In some embodiments, the secondary exit valve 319a-d, 419a-d may be a normally open valve. In some embodiments, the secondary exit valve 319a-d, 419a-d may close within about 5, or about 2.5 seconds, of detecting an abnormal condition.

Thus, one class of embodiments provides a method for removing a solid from a fluidized bed pressure vessel comprising the steps of: providing a discharge system comprising a discharge line, settling vessel, discharge valve, transfer vessel, transfer valve, primary exit valve, and secondary exit valve; filling the settling vessel with a mixture from a fluidized bed pressure vessel, wherein the mixture comprises a solid and a pressurized gas; transferring the solid and a portion of pressurized gas from the settling vessel to the transfer vessel; emptying the transfer vessel to a receiving vessel; monitoring the discharge system for an abnormal condition with an automated control system; and closing the secondary exit valve automatically when the abnormal condition is detected.

In some embodiments of this method, the filling step and the emptying step of a single train of discharge vessels occur at least partially concurrently. Referring to FIG. 3, what is meant by a "single train of discharge vessels" is a settling vessel 307a-d and the associated transfer vessel 314a-d that receives solids from the settling vessel 307a-d. For example, settling vessel 307a and transfer vessel 314a are a "single train of discharge vessels." One skilled in the art will recognize that this means that if the settling vessel 307a-d and the transfer vessel 314a-d of a single train of discharge vessels are filled and emptied at least partially concurrently, only one valve will be closed between the fluidized bed pressure vessel 302 and a receiving vessel (not shown) downstream of the transfer vessel 314a-d. For example, if the first settling vessel 307a is filling while the first transfer vessel 314a is emptying, only the first transfer valve 318a is closed between the fluidized bed pressure vessel 302 and the receiving vessel. Monitoring the discharge system for an abnormal condition with an automated control system and closing the secondary exit valve automatically when the abnormal condition is detected provides a secondary level of protection against blowing high pressure gas and solids from the fluidized bed pressure vessel 302 directly to the receiving vessel, which could result in overpressure or other harmful conditions in the receiving vessel.

In some embodiments, the abnormal condition is detected and the secondary exit valve 319a-d is closed within about 10 seconds or about 5 seconds of the occurrence of the abnormal condition. In any of this class of embodiments, the abnormal condition may be, for example, a high pressure, high flow, or incorrect valve position in the discharge system.

One of ordinary skill in the art may realize that as the number of depressurizing and repressurizing steps for each tank increases, the efficiency of the discharge system may increase. By adding additional depressurizing and repressurizing steps, the potential for increased gas and gas/liquid recovery prior to emptying increases. As such, the discharge system may result in greater gas recovery and less raw material loss.

One of skill in the art will also recognize that discharge system gas efficiency is improved by minimizing the valved-in volume of the discharge system that is not filled with a solid after the filling step. As used herein, the valved-in volume of a vessel refers to the combined volume of the vessel and the associated piping fluidly connected to the vessel up to the first closed automatic valve.

Using the methods and devices described herein, a product discharge system that provides improved gas efficiency may be provided. In any embodiment of the invention, a volume of discharged solid particles may be at least 95%, 98%, or 100% of an actual volume of the settling vessel. In any embodiment, the volume of discharged solid particles may be greater that about 90%, 95% or about 100% of a valved-in volume.

While described relative to embodiments of the present disclosure described herein, one of ordinary skill in the art will realize that any discharge system or method in accordance with the present disclosure may be retrofitted into an existing discharge system for removing solids from a pressure vessel. For example, in one alternate embodiment, the discharge systems and methods disclosed herein may be applied to an existing discharge system by modifying the existing discharge system to include features, for example, multi-port valves, discussed above.

Further, in some embodiments greater solids removal capacity is desirable. Embodiments of the present discharge system may be run with more than one vessel at least partially concurrently filling while more than one vessel are at least partially concurrently discharging. In some embodiments, the gas recovery efficiency may be reduced by decreasing the number of equalization steps for the advantage of increasing the solids removal rate.

Additional advantages may be realized by increasing the frequency of product drops from the settling vessels. Tank size may be varied to allow the optimal product drop intervals without risking loss of recyclable material. Further, smaller valves and piping may be used in discharge systems with more tanks, thereby decreasing initial discharge system installation costs, as well as costs for maintenance and replacement.

Furthermore, because of the additional pressure equalization steps, some embodiments of the current discharge system may provide a decrease in the loss of gas and gas/liquid mixture from the discharge system. In certain embodiments, the discharge system may be efficient enough so as to remove post discharge gas recovery/recycling systems used in current discharge systems.

Examples Derived from Modeling Techniques

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description of how to make and use the compounds of the invention, and are not intended to limit the scope of that which the inventors regard as their invention.

The following examples are derived from modeling techniques and although the work was actually achieved, the inventors are not presenting these examples in the past tense to comply with M.P.E.P. §608.01(p) if so required.

An Improved Product Discharge System (IPDS) is simulated in the example below to demonstrate the potential effect of conical heads on the capacity and gas efficiency of the system. In all examples herein, ideal gas laws apply. Examples 1 and 2 are based on operation with a Linear Low Density Polyethylene (LLDPE) of 0.918 gr/cc (918 kgs/m$^3$) density granular resin with a 22 lbs/ft$^3$ (352 kgs/m$^3$) settled bulk density and 15.4 lbs/ft$^3$ (247 kgs/m$^3$) fluidized bulk density. In the LLDPE examples herein, a 62% void space in the settled material ((918-352)/918) and 73% void space in the fluidized resin is assumed. The solid density range for LLDPE is typically, for example, about 910 to 930 kgs/m$^3$ and the range for settled bulk density in a gas phase process is typically, for example, about 336 to 431 kgs/m$^3$. Fluidized bulk density is typically, for example, between about 208 to 352 kgs/m$^3$ but can be lower if there is excessive dilution. From this it can be seen that in all cases there will be a substantial difference in the void volume between fluidized to settled to solid. However, the examples herein are representative of the ability of the invention to deliver value for all products.

Examples 3 and 4 are based on operation with a High Density Polyethylene (HDPE) of about 0.948 gr/cc (948 kgs/m$^3$) density granular resin with a 29.5 lbs/ft$^3$ (412 kgs/m$^3$) settled bulk density and 21 lbs/ft$^3$ (336 kgs/m$^3$) fluidized bulk density. These Examples provide results applicable to HDPE, which may have a density range, for example, from about 0.930 to about 0.980 kgs/m$^3$. The settled bulk density may range, for example, from about 352 to 486 kgs/m$^3$ while the fluidized bulk density may be between about 208 to 352 kgs/m$^3$.

Simulations for all examples are based on two sets of discharge vessels, "trains," with settling vessels crosstied, and transfer vessels crosstied. Settling vessels are assumed to have a volume of 169.6 ft$^3$ (4.802 m$^3$) and assumed to be equipped with 8-inch (0.20 meter) inlets and 12-inch (0.30 meter) outlets. The transfer vessels are assumed to be the same volume as the settling vessels, with 12-inch (0.30 meter) inlets and 8-inch (0.20 meter) outlets. Resin fill volumes are based on the ideal assumption that the volume of resin filling the vessel is controlled by a 35 degree angle of repose of the granular resin. Although granular resins settle at an angle that is less than the angle of repose, this angle is used for comparative purposes to show the theoretical changes in system capacity and efficiency.

Simulations for LLDPE and HDPE are shown in Cases A-F. For Case A (the baseline case), the capacity is simulated for an IPDS with elliptical tops heads on both the settling vessels and transfer vessels assuming the steps of: filling; equalizing the transfer vessel with the other transfer vessels; transferring to the transfer vessel, equalizing the transfer vessel with the other transfer vessels and re-equalizing the settling vessel from the other settling vessels; emptying the transfer vessels; and re-equalizing the transfer vessel from the other transfer vessels. Capacity for Case B using the same cycle steps using conical heads and theoretical angle of repose for the fill capacity is then simulated. The theoretical effect on system capacity is shown in Tables 1 and 3 for LLDPE and HDPE, respectively. In Cases A and B, it is assumed that the IPDS uses a primary vent valve located at the top of the vent line mounted flush with the side of the fluidized pressure vessel. In Cases A and B, the total valved-in volume is calculated to be about 193.9 ft$^3$ (5.490 m$^3$) based on settling vessels of 169.6 ft$^3$ (4.802 m$^3$) and piping volumes of 24.3 ft$^3$ (0.688 m$^3$).

In Case C, results are simulated for an IPDS with conical heads, a lowered vent valve wherein the vent valve is located within 25 feet (7.6 meters) of the settling vessel. In this case, the same 169.6 ft$^3$ (4.80 m$^3$) settling vessel volume is used, but the piping volume is reduced to 15.7 ft$^3$ (0.445 m$^3$), making the total valved-in volume about 185.3 ft$^3$ (5.247 m$^3$).

In Case D, results are simulated assuming an IPDS with conical head, a lowered vent valve wherein the vent valve is located within 25 feet (7.6 meters) of the settling vessel, and flow-controlling type crosstie valves. In this case, the valved-in volume is also assumed to be 185.3 ft$^3$ (5.247 m$^3$) because adding the flow-controlling type crosstie valve will not affect the system volume.

In Case E, results are simulated assuming an IPDS with conical head, a lowered vent valve wherein the vent valve is located within 25 feet (7.6 meters) of the settling vessel, flow-controlling-type crosstie valves, and an automated secondary exit valve. Use of the automated secondary exit valve theoretically provides an increase in capacity by allowing the settling vessel in a train to fill concurrently while the transfer vessel in that train is being safely emptied. Thus, the time to fill the discharge vessel will not add to the total cycle time for the system.

In case F, results are simulated for an IPDS with conical heads, flow-controlling-type crosstie valves, an automated secondary exit valve, and two vent valves (primary and secondary) wherein the primary vent valve is located at or near the reactor nozzle and the secondary vent valve is located within 38.5 feet (11.7 meters) of the settling vessel.

Example 1

Example 1 shows the increase in capacity that can theoretically be obtained using the improvements of the current invention with LLDPE polyethylene production. As can be seen in Table 1, the conical heads of Case B allow for an increased capacity of about 8% due to removing more resin per drop than a system using elliptical heads.

TABLE 1

LLDPE Product Discharge System Capacity

| Case | Drop Size kgs/drop | Cycle Time sec | Drops/ hr | Maximum Rate kgs/hr | Capacity % of Case A |
|---|---|---|---|---|---|
| A | 1,732 | 222 | 32.4 | 56,188 | 100 |
| B | 1,862 | 221 | 32.6 | 60,669 | 108 |
| C | 1,802 | 220 | 32.8 | 59,113 | 105 |
| D | 1,802 | 207 | 34.9 | 62,834 | 112 |
| E | 1,802 | 175 | 41.1 | 74,144 | 132 |
| F | 1,862 | 175 | 41.1 | 76,616 | 136 |

As shown in Table 1, the lowered vent valve of Case C results in a slightly smaller drop size than Case B, which results in a slightly lower capacity than when using a conical head alone.

The capacity improvement for Case D (adding the flow-controlling type crosstie valves) is demonstrated to be 112% of Case A versus the 105% for Case C with the same vent valve location. This advantage is gained because the equalization occurs faster as the flow rate of the equalization is maintained at a higher level. The equalization step for the settling vessel is completed in about 12 seconds for the flow-controlling type crosstie valve versus 22 seconds for the standard crosstie valve. The equalization time for the transfer vessel is estimated to be about 13 seconds for the flow-controlling type crosstie valve versus 19 seconds for the standard crosstie valve. This reduces the theoretical total cycle time of the IPDS from about 222 seconds for Case A to 207 seconds for Case D. As shown in Table 1, the shorter cycle time results in more drops per hour, and thus an hourly capacity of about 112% of that of Case A.

For Case E, the total cycle time can be reduced from about 222 seconds for Case A to about 175 seconds. As shown in Table 1, the shorter cycle time results in more drops per hour, and thus an hourly capacity that is about 132% of that of Case A.

In Case F, the primary vent valve closes before the secondary vent valve, causing the fluidized resin contained in the vent line to settle into the settling vessel or attached piping and increase the drop size from the 1,802 kgs of Case E to 1,862 kgs. After the secondary vent valve is closed the valved-in volume is unchanged from Case E. As shown in Table 1, the larger drop size increases the hourly capacity of LLDPE to about 136% of that of Case A.

Example 2

The theoretical effect of conical heads on product discharge system efficiency for LLDPE polyethylene production can also be simulated using the assumptions described above. The effects of the various features of the invention on IPDS efficiency for LLDPE are shown in Table 2.

TABLE 2

LLDPE Product Discharge System Efficiency

| | IPDS Efficiency | | | Gas Loss | | |
|---|---|---|---|---|---|---|
| Case | Resin Fill Efficiency % | Gas Volume % of Total System Volume % | Gas Recovery % of Case A % | Net Gas Loss/ Drop kgmole/ drop | Net Gas Loss Rate kgmole/ kg PE | Gas Loss vs. Case A % |
| A | 89.5 | 65.6 | 100 | 0.30 | 0.00017 | 0.0 |
| B | 96.2 | 63.0 | 104 | 0.28 | 0.00015 | −11.8 |
| C | 97.5 | 62.6 | 105 | 0.26 | 0.00015 | −14.9 |
| D | 97.5 | 62.6 | 105 | 0.26 | 0.00015 | −14.9 |
| E | 97.5 | 62.6 | 105 | 0.26 | 0.00015 | −14.9 |
| F | 98.3 | 62.3 | 106 | 0.27 | 0.00014 | −16.8 |

As shown in Table 2, the fill efficiency for Case B (conical heads) theoretically increases from 89.5% in Case A to 96.2%. As used herein, Resin Fill Efficiency is the volume of settled resin per drop divided by the valved-in volume (defined in the specification above). The Gas Volume is the volume of gas in the interstitial spaces between the resin particles and above the resin. Gas Recovery % is the amount of gas that is retained in the IPDS as compared to the base case of the IPDS with the elliptical heads. The Net Gas Loss is the amount of gas (per drop or per kg of resin) that travels with the granular resin to the downstream receiving vessel when the transfer tank is emptied. The Gas Loss vs. Case A reflects the theoretical amount of gas lost compared to the standard IPDS with elliptical heads of Case A. Thus, this Example shows that, theoretically, the Resin Fill Efficiency of the conical heads could be as much as 6.7% better than a system with the elliptical heads (a 7.5% improvement) and the gas losses could be about 17.6% less than a system with the elliptical heads.

Next, the improvements in efficiency that can theoretically be obtained using the lowered vent valve of Case C were determined. Lowering the vent valve to within 38.5 feet (11.7 meters) decreases the piping volume as discussed above, thus resulting in less unfilled volume and a corresponding increase in efficiency. As shown in Table 2, lowering the vent valve resulted in a Resin Fill Efficiency of 97.5% as opposed to a Resin Fill Efficiency of 96.2% over a system with conical heads alone. The gas losses theoretically improve to show a loss improvement of 20.4% versus 17.6% improvement for a system with conical heads alone.

Next, the improvements in efficiency that can theoretically be obtained using the two vent valves of Case F are simulated. Using the primary and secondary vent valves results in more resin being contained within the same valved-in volume. As shown in Table 2 this increases the percentage of filled space from 97.5% of Cases C-E to 98.3%. The gas losses are further reduced, in theory, showing a loss improvement of 22.3% versus 20.4% with the single lowered vent valve.

Example 3

Example 3 shows the increase in capacity that can theoretically be obtained using the improvements of the embodiments described herein with HDPE polyethylene production. The theoretical effect on system capacity is shown in Table 3 for each of the Cases A-E described above. As can be seen in Table 3, the conical heads of Case B theoretically result in an increased capacity of about 8% (108% of the base case) for HDPE due to removing more resin per drop than a system using elliptical heads.

TABLE 3

HDPE Product Discharge System Capacity

| Case | Drop Size kgs/drop | Cycle Time sec | Drops/ hr | Maximum Rate kgs/hr | Capacity % of Case A |
|---|---|---|---|---|---|
| A | 2,327 | 225 | 32.1 | 74.628 | 100 |
| B | 2,501 | 223 | 32.3 | 80,746 | 108 |
| C | 2,419 | 221 | 32.6 | 78,808 | 106 |
| D | 2,419 | 209 | 34.5 | 83,533 | 112 |
| E | 2,419 | 177 | 40.7 | 98,398 | 132 |
| F | 2.501 | 177 | 40.7 | 101,731 | 136 |

As with the LLDPE Example, Case C results in a slightly smaller drop size for HDPE than Case B, which results in a slightly lower capacity than when using a conical head alone.

In Case D, the advantage of adding the flow-controlling type crosstie valves is simulated to be 112% of Case A versus the 106% for Case C. This advantage is gained because the equalization occurs faster as the flow rate of the equalization is maintained as a higher lever. The equalization step for the settling vessel is assumed to be completed in about 14 seconds for the flow-controlling type crosstie valve versus 26 seconds for the current system with the standard crosstie valve. The equalization time for the transfer vessel is assumed to be about 13 seconds for the flow-controlling type crosstie valve versus 17 seconds for the current design crosstie valve. This reduces the total cycle time of the IPDS from about 225 seconds for Case A to 209 seconds for Case D. As shown in Table 3, the shorter cycle time results in more drops per hour, and thus an hourly capacity of about 112% of that of Case A.

In Case E, the total cycle times for HDPE can theoretically be reduced from about 225 seconds for Case A to about 177 seconds for Case E. As shown in Table 3, the shorter cycle time results in more drops per hour, and thus an hourly capacity that is about 132% of that of Case A.

In Case F, the drop size theoretically increases from the 2,419 kgs of Case E to 2,501 kgs for HDPE. As shown in Table 3, the larger drop size increases the hourly capacity to about 136% of that of Case A.

Example 4

The effect of conical heads on product discharge system efficiency for HDPE polyethylene production can also be simulated using the assumptions described above. The theoretical effects of the various features of the invention on IPDS efficiency for HDPE are shown in Table 4.

TABLE 4

HDPE Product Discharge System Efficiency

| | IPDS Efficiency | | | Gas Loss | | |
|---|---|---|---|---|---|---|
| | | Gas | | | | |
| Case | Resin Fill Efficiency % | Volume % of Total System Volume % | Gas Recovery % of Case A % | Net Gas Loss/ Drop kgmole/ drop | Net Gas Loss Rate kgmole/ kg PE | Gas Loss vs. Case A % |
| A | 89.7 | 55.3 | 100 | 0.195 | 0.000084 | 0.0 |
| B | 96.4 | 51.9 | 106 | 0.160 | 0.000064 | −23.8 |
| C | 97.6 | 51.3 | 108 | 0.147 | 0.000061 | −27.4 |
| D | 97.6 | 51.3 | 108 | 0.147 | 0.000061 | −27.4 |
| E | 97.6 | 51.3 | 108 | 0.147 | 0.000061 | −27.4 |
| F | 98.2 | 51.0 | 108 | 0.148 | 0.000059 | −29.2 |

As shown in Table 4, the fill efficiency for HDPE theoretically increases from 89.7% in Case A using elliptical heads to 96.4% using the conical heads of Case B. This Example shows that theoretically the Resin Fill Efficiency of a system with conical heads could be as much as 6.7% better than a system with elliptical heads, resulting in the gas losses of about 23.8% less than a system with elliptical heads.

Next, the improvements in efficiency for HDPE that can theoretically be obtained using Case C (a lowered vent valve). Lowering the vent valve to within 38.5 feet (11.7 meters) decreases the piping volume as discussed above, thus resulting in less unfilled volume and a corresponding increase in efficiency. As shown in Table 4, lowering the vent valve theoretically results in a Resin Fill Efficiency of 97.6% as opposed to a Resin Fill Efficiency of 96.4% over a system with conical heads alone. The gas losses theoretically improve to show a loss improvement of 27.4% versus 23.8% improvement for a system with conical heads alone.

Next, the improvements in efficiency that can theoretically be obtained using the two vent valves of Case F are simulated. As shown in Table 4, Case F theoretically increases the percentage of filled space from 97.6% of Cases C-E to 98.2%. The gas losses theoretically improve to show a loss improvement of 29.5% over the Case A.

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A discharge system, the discharge system comprising:
   (a) a settling vessel comprising a conical top head;
   (b) a discharge line fluidly connecting a gas phase fluidized bed polymerization vessel to the settling vessel;
   (c) a primary discharge valve that controls a discharge flow of a fluid mixture from the gas phase fluidized bed polymerization vessel through the discharge line to the settling vessel;
   (d) a transfer vessel in fluid communication with the settling vessel;
   (e) a transfer valve between the settling vessel and the transfer vessel that controls a transfer flow from the settling vessel to the transfer vessel; and
   (f) a primary exit valve that controls an exit flow of the fluid mixture from the transfer vessel;
   wherein the discharge system further comprises a secondary exit valve, where both the primary exit valve and the secondary exit valve control the exit flow from the transfer vessel; and
   wherein the discharge system further comprises a means to detect an abnormal condition in the discharge system; and a means to close the secondary exit valve upon detection of the abnormal condition.

2. The discharge system of claim 1, wherein the transfer vessel comprises a conical top head.

3. The discharge system of claim 1, comprising a secondary discharge valve in series with the primary discharge valve, wherein the primary discharge valve and the secondary discharge valve are located between the fluidized bed pressure vessel and the settling vessel, and wherein both the primary discharge valve and the secondary discharge valve control the discharge flow to the settling vessel.

4. The discharge system of claim 3, comprising at least two secondary discharge valves and at least two settling vessels, wherein each secondary discharge valve controls the flow to one settling vessel, and wherein one primary discharge valve is in fluid communication with the at least two secondary discharge valves and the at least two settling vessels, such that the one primary discharge valve, in combination with the at least two secondary discharge valves, controls the discharge flow to each of the at least two settling vessels.

5. The discharge system of claim 1, comprising:
   (a) a vent line fluidly connecting an upper portion of the fluidized bed pressure vessel and the settling vessel; and
   (b) a primary vent valve that controls a vent flow through the vent line.

6. The discharge system of claim 5, comprising a secondary vent valve in series with the primary vent valve that controls the vent flow through the vent line in addition to the primary vent valve.

7. The discharge system of claim 6, comprising at least two secondary vent valves and at least two settling vessels, wherein each secondary vent valve controls the vent flow between the upper portion of the fluidized bed pressure vessel and one settling vessel, and wherein one primary vent valve is in fluid communication with the at least two secondary vent valves and the at least two settling vessels, such that the one primary vent valve, in combination with the at least two secondary vent valves, controls the vent flow between the upper portion of the fluidized bed pressure vessel and each of the at least two settling vessels.

8. The discharge system of claim 1, wherein the means to detect an abnormal condition comprises an automated control system and a means to detect pressure, flow, temperature, vessel stress, valve position, or actuator position.

9. The discharge system of claim 1, wherein the means to close the secondary exit valve comprises the automated control system and a signal to close the secondary exit valve.

10. The discharge system of claim 1, wherein the secondary exit valve is normally open.

11. The discharge system of claim 1, wherein the secondary exit valve closes within about 5 seconds or within about 2.5 seconds of detection of the abnormal condition.

12. The discharge system of claim 1, comprising a solids monitoring device that detects when a settling vessel is full.

13. The discharge system of claim 1, comprising a dry-gas purge fed to the settling vessel or the transfer vessel.

14. The discharge system of claim 1, comprising a clean-gas purge fed to the discharge line.

15. A method for removing a solid from a fluidized bed pressure vessel, the method comprising the steps of:
   (a) providing a discharge system comprising a plurality of settling vessels and a plurality of transfer vessels, wherein at least one of the plurality of settling vessels comprises a conical top head;
   (b) filling a first settling vessel of the plurality of settling vessels with a mixture from a fluidized bed pressure vessel, wherein the mixture comprises a solid and a pressurized gas;
   (c) equalizing the first settling vessel, wherein a first portion of pressurized gas is transferred from the first settling vessel to at least one of the plurality of settling vessels that is not the first settling vessel;
   (d) transferring the solid and a second portion of pressurized gas from the first settling vessel to a first transfer vessel;
   (e) re-equalizing the first settling vessel, wherein a return pressurized gas is transferred from at least one of the plurality of settling vessels that is not the first settling vessel to the first settling vessel;
   (f) equalizing the first transfer vessel with a second transfer vessel, wherein a third portion of the pressurized gas is transferred from the first transfer vessel to at least one of the plurality of transfer vessels that is not the first transfer vessel;
   (g) emptying the first transfer vessel; and
   (h) re-equalizing the first transfer vessel, wherein a return transfer gas is transferred from at least one of the plurality of transfer vessels that is not the first transfer vessel to the first transfer vessel;
      wherein the discharge system provided comprises a primary exit valve and a secondary exit valve, and wherein the secondary exit valve is closed automatically when an abnormal condition is detected.

16. The method of claim 15, wherein at least one of the plurality of transfer vessels comprises a conical top head.

17. The method of claim 15, comprising the step of clean-gas purging a discharge line or a vent line.

18. The method of claim 15, comprising the step of dry-gas purging at least one of the plurality of settling vessels or at least one of the plurality of transfer vessels.

19. The method of claim 15, wherein a volume of discharged solid particles is at least 100% of an actual volume of the settling vessel.

20. The method of claim 15, wherein a volume of discharged solid particles is greater than about 90% of greater than about 95% of a valved-in volume of the first settling vessel.

21. A discharge system, the discharge system comprising:
   (a) at least three settling vessels arranged in parallel;
   (b) a discharge line fluidly connecting a fluidized bed pressure vessel to at least one of the at least three settling vessels;
   (c) a primary discharge valve that controls a discharge flow of a fluid mixture from the fluidized pressure vessel through the discharge line to at least one of the at least three settling vessels;
   (d) a vent line fluidly connecting an upper portion of the fluidized bed pressure vessel and at least one of the at least three settling vessels;
   (e) a primary vent valve that controls a vent flow through the vent line;
   (f) at least three crosstie lines fluidly connecting the at least three settling vessels;
   (g) a crosstie valve that controls a crosstie flow through the at least three crosstie lines, wherein the crosstie valve is a multi-port valve;
   (h) at least three transfer vessels in fluid communication with the at least three settling vessels;
   (i) at least three transfer valves between the at least three settling vessels and the at least three transfer vessels that control a plurality of transfer flows from the at least three settling vessels to the at least three transfer vessels;
   (j) a lower crosstie line fluidly connecting at least two of the at least three transfer vessels;
   (k) a lower crosstie valve that controls a lower crosstie flow through the lower crosstie line;
   (l) at least three primary exit valves that control a plurality of exit flows of the fluid mixture from the at least three transfer vessels;
   (m) at least one secondary exit valve, where both the primary exit valve and the secondary exit valve control the exit flow from at least one transfer vessels; and
      wherein the discharge system further comprises a means to detect an abnormal condition in the discharge system and a means to close at least one secondary exit valve upon detection of the abnormal condition.

22. The discharge system of claim 21, wherein the crosstie valve or the lower crosstie valves is a flow-controlling type valve.

23. The discharge system of claim 21, wherein the crosstie valve or lower crosstie valve has a variable flow area depending on the degree of rotation of a stem of the crosstie valve.

24. The discharge system of claim 21, wherein the crosstie valve or lower crosstie valve is a v-ball valve.

25. The discharge system of claim 21, wherein the crosstie line or lower crosstie line is absent a flow restricting device other than the crosstie valve.

26. A discharge system, the discharge system comprising:
(a) a plurality of settling vessels arranged in parallel;
(b) a discharge line fluidly connecting a fluidized bed pressure vessel to at least two of the plurality of settling vessels, wherein a clean-gas purge line is fed to the discharge line;
(c) a primary discharge valve, wherein one primary discharge valve controls a discharge flow of a fluid mixture from the fluidized pressure vessel through the discharge line to at least two of the plurality of settling vessels;
(d) a plurality of secondary discharge valves, wherein each of the plurality of secondary discharge valves controls the discharge flow to at least one of the plurality of settling vessels;
(e) a plurality of transfer vessels in fluid communication with the plurality of settling vessels;
(f) a plurality of transfer valves between the plurality of settling vessels and the plurality of transfer vessels that control a plurality of transfer flows from the plurality of settling vessels to the plurality of transfer vessels; and
(g) a plurality of primary exit valves that control a plurality of exit flows of the fluid mixture from the plurality of transfer vessels.

27. The discharge system of claim 26, comprising:
(a) a vent line fluidly connecting an upper portion of the fluidized bed pressure vessel and at least one settling vessel; and
(b) a primary vent valve that controls a vent flow through the vent line.

28. The discharge system of claim 27, comprising a secondary vent valve in series with the primary vent valve that controls the vent flow through the vent line in addition to the primary vent valve.

29. The discharge system of claim 28, comprising at least two secondary vent valves and at least two settling vessels, wherein each secondary vent valve controls the vent flow between the upper portion of the fluidized bed pressure vessel and one settling vessel, and wherein one primary vent valve is in fluid communication with the at least two secondary vent valves and the at least two settling vessels, such that the one primary vent valve, in combination with the at least two secondary vent valves, controls the vent flow between the upper portion of the fluidized bed pressure vessel and each of the at least two settling vessels.

30. The discharge system of claim 26, comprising a dry-gas purge fed to the settling vessel or the transfer vessel.

31. The discharge system of claim 27, comprising a clean-gas purge fed to the vent line.

32. A discharge system, the discharge system comprising:
(a) a settling vessel;
(b) a discharge line fluidly connecting a fluidized bed pressure vessel to the settling vessel;
(c) a discharge valve that controls a discharge flow of a fluid mixture from the fluidized pressure vessel through the discharge line to the settling vessel;
(d) a transfer vessel that receives solid particles from the settling vessel;
(e) a transfer valve between the settling vessel and the transfer vessel that controls a transfer flow from the settling vessel to the transfer vessel;
(f) a primary exit valve that controls an exit flow of the fluid mixture from the transfer vessel;
(g) a secondary exit valve that controls the exit flow of the fluid mixture from the transfer vessel in addition to the primary exit valve;
(h) a means to detect an abnormal condition in the discharge system; and
(i) a means to close the exit valve upon detection of the abnormal condition;
wherein the secondary exit valve is normally open.

33. The discharge system of claim 32, wherein the means to detect an abnormal condition comprises an automated control system and a means to detect pressure, flow, temperature, vessel stress, valve position, or actuator position.

34. The discharge system of claim 32, wherein the means to close the secondary exit valve comprises the automated control system and a signal to close the secondary exit valve.

35. The discharge system of claim 32, wherein the secondary exit valve closes within about 5 seconds or about 2.5 seconds of detection of the abnormal condition.

36. A method for removing a solid from a fluidized bed pressure vessel, the method comprising the steps of:
(a) providing a discharge system comprising a discharge line, settling vessel, discharge valve, transfer vessel, transfer valve, primary exit valve, and secondary exit valve;
(b) filling the settling vessel with a mixture from a fluidized bed pressure vessel, wherein the mixture comprises a solid and a pressurized gas;
(c) transferring the solid and a portion of pressurized gas from the settling vessel to the transfer vessel;
(d) emptying the transfer vessel to a receiving vessel;
(e) monitoring the discharge system for an abnormal condition with an automated control system; and
(f) closing the secondary exit valve automatically when the abnormal condition is detected, wherein the abnormal condition is detected and the secondary exit valve is closed within about 2.5 seconds, or about 5 seconds, or about 10 seconds of the occurrence of the abnormal condition.

37. The method of claim 36, wherein the filling step and the emptying step of a single train of discharge vessels occur at least partially concurrently.

38. The method of claim 36, wherein there is only a single valve closed between the fluidized bed pressure vessel and the receiving vessel during some portions of steps (a)-(d).

39. The method of claim 36, wherein the abnormal condition is a high pressure, high flow, or incorrect valve position in the discharge system.

40. A discharge system, the discharge system comprising:
(a) a plurality of settling vessels arranged in parallel;
(b) a discharge line fluidly connecting a fluidized bed pressure vessel to at least one of the plurality of settling vessels;
(c) a primary discharge valve that controls a discharge flow of a fluid mixture from the fluidized pressure vessel through the discharge line to at least one of the plurality of settling vessels;
(d) a crosstie line fluidly connecting at least two of the plurality of settling vessels;

(e) a crosstie valve that controls a crosstie flow through the crosstie line, wherein the crosstie valve is a flow-controlling type valve;
(f) a plurality of transfer vessels in fluid communication with the plurality of settling vessels;
(g) a plurality of transfer valves between the plurality of settling vessels and the plurality of transfer vessels that control a transfer flow from the plurality of settling vessels to the plurality of transfer vessels;
(h) a lower crosstie line fluidly connecting at least two of the plurality of transfer vessels;
(i) a lower crosstie valve that controls a lower crosstie flow through the lower crosstie line, wherein the crosstie line or the lower crosstie line is absent a flow restricting device other than the crosstie valve; and
(j) a plurality of primary exit valves that control a plurality of exit flows of the fluid mixture from the plurality of transfer vessels.

41. The discharge system of claim 40, wherein the lower crosstie valve is a flow-controlling type valve.

42. The discharge system of claim 40, wherein the crosstie valve or the lower crosstie valve has a variable flow area depending on the degree of rotation of a stem of the crosstie valve.

43. The discharge system of claim 40, wherein the crosstie valve or the lower crosstie valve is an eccentric plug rotary valve, v-ball valve, or butterfly valve.

* * * * *